US012789798B2

(12) United States Patent
Shi et al.

(10) Patent No.: US 12,789,798 B2
(45) Date of Patent: Nov. 10, 2026

(54) INTERFERENCE DETECTION ARCHITECTURE FOR AUTONOMOUS VEHICLES

(71) Applicant: Aurora Operations, Inc., Pittsburgh, PA (US)

(72) Inventors: Haomin Shi, Pittsburgh, PA (US); Cuichun Xu, Sewickley, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 20 days.

(21) Appl. No.: 18/933,623

(22) Filed: Oct. 31, 2024

(65) Prior Publication Data

US 2026/0116381 A1 Apr. 30, 2026

(51) Int. Cl.
*B60W 30/095* (2012.01)
*B60W 50/14* (2020.01)
*B60W 60/00* (2020.01)

(52) U.S. Cl.
CPC .... *B60W 30/0956* (2013.01); *B60W 30/0953* (2013.01); *B60W 50/14* (2013.01); *B60W 60/001* (2020.02); *B60W 2554/4041* (2020.02)

(58) Field of Classification Search
CPC ......... B60W 30/0956; B60W 30/0953; B60W 50/14; B60W 60/001; B60W 2554/4041
USPC ............................................................ 701/25
See application file for complete search history.

(56) References Cited

U.S. PATENT DOCUMENTS

| | | | | |
|---|---|---|---|---|
| 11,787,439 | B1 | 10/2023 | Bagnell et al. | |
| 11,801,871 | B1 | 10/2023 | Choudhury et al. | |
| 2013/0035827 | A1* | 2/2013 | Breed | B60W 40/06 701/45 |

(Continued)

FOREIGN PATENT DOCUMENTS

| | | |
|---|---|---|
| WO | WO 2023/136977 | 7/2023 |
| WO | WO 2023/225284 | 11/2023 |

(Continued)

OTHER PUBLICATIONS

International Search Report and Written Opinion, PCT/US2023/037074. Mailed Mar. 8, 2024. 9pgs.

(Continued)

*Primary Examiner* — Isaac G Smith
(74) *Attorney, Agent, or Firm* — Dority & Manning, P.A.

(57) ABSTRACT

Systems and methods to determine a potential interference between an object and an autonomous vehicle are disclosed. The method can include obtaining object-track data and autonomous vehicle-track data and determining that at least a portion of the track of the object overlaps with the track of the autonomous vehicle. The method can include determining that a threshold quantity of first sensor data points associated with the track of the object is at least partially within a threshold distance of the track of the autonomous vehicle. The method can include determining that the first sensor data points have a threshold closing velocity relative to the autonomous vehicle. The method can include determining an occurrence of a potential interference between the object and the autonomous vehicle for the first timeframe, based on determining that the first sensor data points have a threshold closing velocity relative to the autonomous vehicle.

20 Claims, 13 Drawing Sheets

(56) References Cited

U.S. PATENT DOCUMENTS

| | | | | |
|---|---|---|---|---|
| 2014/0009275 | A1* | 1/2014 | Bowers | G06Q 20/145 340/436 |
| 2021/0261159 | A1* | 8/2021 | Pazhayampallil | B60W 30/09 |
| 2022/0266871 | A1* | 8/2022 | Hayashi | B60W 60/00272 |
| 2023/0227061 | A1 | 7/2023 | Ziebart | |
| 2023/0375713 | A1 | 11/2023 | Lin et al. | |
| 2023/0375714 | A1 | 11/2023 | Lin et al. | |
| 2023/0400589 | A1 | 12/2023 | Lin et al. | |
| 2024/0103522 | A1 | 3/2024 | Djuric et al. | |
| 2024/0166237 | A1 | 5/2024 | Bagnell et al. | |
| 2024/0217558 | A1 | 7/2024 | Choudhury et al. | |
| 2024/0219574 | A1 | 7/2024 | Lin et al. | |
| 2024/0393466 | A1 | 11/2024 | Ferrara et al. | |

FOREIGN PATENT DOCUMENTS

| | | |
|---|---|---|
| WO | WO 2024/072787 | 4/2024 |
| WO | WO 2024/102431 | 5/2024 |
| WO | WO 2024/145144 | 7/2024 |
| WO | WO 2024/205681 | 10/2024 |

OTHER PUBLICATIONS

Stefan Heinemann, U.S. Appl. No. 18/178,245, filed Mar. 3, 2023, Light Detection and Ranging (LIDAR) System Including a Light Modulation Unit.

J. Andrew Bagnell, U.S. Appl. No. 18/903,361, filed Oct. 1, 2024, Autonomous Vehicle Motion Planning.

Trang Thu Tran Dang, U.S. Appl. No. 18/585,943, filed Jan. 23, 2024, Training a Motion Planning System for an Autonomous Vehicle.

Silia Gazepi, U.S. Appl. No. 18/440,005, filed Feb. 13, 2024, Autonomous Vehicle Motion Control for Pull-Over Maneuvers.

* cited by examiner

INTERFERENCE DETECTION ARCHITECTURE FOR AUTONOMOUS VEHICLES

BACKGROUND

An autonomous platform can process data to perceive an environment through which the autonomous platform travels. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

The technology of the present disclosure relates to detecting close-range interactions between an autonomous vehicle and objects within the environment of the vehicle. For instance, within a closed coursed testing environment, an autonomous vehicle may interact with test vehicles that can provide the autonomous vehicle with various operating scenarios. Within simulated virtual environments, a simulated autonomous vehicle may interact with simulated vehicles to test autonomy software across a variety of conditions.

As new scenarios are tested, interactions with these objects may result in the objects, at least partially, crossing a spatial boundary of the autonomous vehicle. The spatial boundary may define a bounding shape that encompasses the autonomous vehicle and may be offset from the exterior surface of the autonomous vehicle by a threshold distance. A bounding shape may be two or three-dimensional. Encroachment within the spatial boundary results in the object coming within the threshold distance from the autonomous vehicle. This may include a low-impact or low-velocity collision between the object and the autonomous vehicle, within the testing/simulated environment.

Interference detection can be a valuable tool that helps determine the circumstances that may have led to the interference. These interferences can provide insight into how the autonomous vehicle responds to one or more stimuli in its operating environment. Moreover, despite robust sensor suites, low-impact or low-velocity interferences within a testing environment may be difficult to detect given their proximity to the autonomous vehicle. However, improvements in interference detection may allow for otherwise undetectable interference to be identified, tracked, and catalogued for use in avoiding them in the real world.

The technology of the present disclosure provides an improved approach to detecting an interference between an autonomous vehicle and an object. For example, an autonomous vehicle may operate within an environment (e.g., a closed course testing environment). The autonomous vehicle may obtain sensor data associated with an object (e.g., a test object). The sensor data may include LIDAR data. The LIDAR data may include a plurality of LIDAR data points forming a three-dimensional point cloud. In some implementations, the autonomous vehicle may capture other sensor data such as RADAR data, inertial measurement data, audio data, etc.

The autonomous vehicle may obtain object-track data that indicates a track of the object. The object-track data may be generated based on the sensor data by, for example, a perception system of the autonomous vehicle. A track may record movement of an object within an environment over time. An example track stores a series of key points indicating the current location and one or more past locations of the object within the environment. The object track can indicate the object category (e.g., vehicle, bicycle, pedestrian) and the dynamics of the object (e.g., heading, acceleration, timestamps).

In some implementations, the autonomous vehicle may filter out ephemeral tracks from its interference analysis to more efficiently allocate its processing resources. Ephemeral tracks may refer to temporary obstacles such as debris that may suddenly appear on the road. Additionally, or alternatively, ephemeral tracks may correspond to artifacts in an imaging or other detection system. Such artifacts may correspond to a miscoloring in the environment (e.g., a black spot on the road), an inconsistency in the environment (e.g., fog, dust, snow), or mechanical artifacts. Such mechanical artifacts may include lens flares, motion blurs, chromatic aberrations, lens distortions, Moire patterns, dead pixels in the imager, ghosting, or other aberrations. By filtering ephemeral tracks, autonomous vehicles may focus their onboard computing resources on determining inference with more substantive objects. This allows for more efficient usage of the limited computing resources that are onboard the autonomous vehicle.

The autonomous vehicle may compute a variety of indicators to determine whether the autonomous vehicle and the object interfere with one another. The autonomous vehicle may perform this computation over a plurality of timeframes to accumulate evidence that an interference has occurred.

For instance, at a first timeframe, the autonomous vehicle may process the points of the track of the object to identify that at least a portion of the object track overlaps with the track of the autonomous vehicle. The track of the autonomous vehicle may indicate one or more bounding shapes of the autonomous vehicle and position(s) of the autonomous vehicle. The bounding shape may be a representation of a spatial boundary of the autonomous vehicle. For an example autonomous truck, the track may include a rectangle indicating a spatial boundary of an autonomous tractor and a rectangle for a trailer being pulled by the tractor.

Two tracks may be considered to overlap in the event at least a portion of the bounding shape of the object coincides with (e.g., is located in a same position as) at least a portion of the bounding shape of the autonomous vehicle (e.g., at the same time), or at least a portion of the bounding shape of the object falls within the interior region created by the bounding shape of the autonomous vehicle, or vice versa. Such overlap may indicate that the object (e.g., test object) is within a buffer distance from the autonomous vehicle and, potentially, colliding with the autonomous vehicle.

Moreover, for the first timeframe, the autonomous vehicle can determine how many sensor data points (e.g., LIDAR points) associated with the object are at least partially within a threshold distance of the track of the autonomous vehicle. The threshold distance can include, for example, a buffer distance from an exterior surface of the autonomous vehicle. In some implementations, the buffer distance may be defined based on a bounding shape.

The autonomous vehicle can also determine a closing velocity of the object (e.g., its LIDAR point cloud centroid) relative to the autonomous vehicle. A closing velocity above zero or a nominal amount can indicate that the object is moving toward the autonomous vehicle. A nominal amount may refer to some number near zero (e.g., within 1 m/s) but measurably above zero.

Based on the existence of certain conditions, the autonomous vehicle may determine that there is a potential interference between the vehicle and the object within the first timeframe. For example, in the event that at least a portion of the track of the object overlaps with the track of the autonomous vehicle, there are a threshold quantity of sensor data points at least partially within a threshold distance of the track of the autonomous vehicle, and the closing velocity of the object is above a velocity threshold (e.g., a positive speed), the autonomous vehicle may determine that a potential interference has occurred in the first timeframe.

The autonomous vehicle may iteratively perform this analysis over a plurality of second, subsequent timeframes. This can allow the autonomous vehicle to aggregate evidence of the interference across multiple timesteps to increase its confidence that an interference occurred. In the event that the autonomous vehicle determines that a potential interference occurred across a threshold number of timeframes (e.g., 2-10), the autonomous vehicle can determine that an interference has actually occurred.

In response, the autonomous vehicle can generate an interference alert. The interference alert may identify a likelihood that the interference is real (as further described herein), a classification of the object, an identifier associated with the track, a location of the interference within the environment, a location of the interference on the autonomous vehicle, a time of the interference, a relative speed of the object at the time of the interference, a direction of travel of the object at the time of the interference, degree of entanglement between the autonomous vehicle and the object following the interference, or other information.

The interference alert may be utilized by the autonomous vehicle or a system that is remote from the autonomous vehicle. For example, the interference alert may be provided to the onboard motion planner to control the autonomous vehicle in response to the interference. This may include stopping the autonomous vehicle in a current travel lane or pulling the autonomous vehicle to the shoulder (e.g., within a testing/simulated environment). Additionally, or alternatively, the interference alert can be output to a separate test evaluation system or a remote assistance system to evaluate the interference and assist the vehicle, if needed. In this way, the autonomous vehicle may utilize its local computing resources, and remote computing resources, to appropriately respond to an interference.

The technology disclosed herein provides a technical improvement by improving the functions and performance of a computing system, in addition to the incorporation of a computing system within a vehicle. For example, the computing systems and methods described herein improve existing systems by identifying interactions difficult to detect by existing systems. More particularly, low-impact or low-velocity interferences can be difficult to detect for traditional computing systems, in part due to the small proximities involved. The technology described herein includes specific operations for how computing systems can detect otherwise undetectable interactions, while also reducing the processing resources needed to do so.

For example, the autonomous vehicle can determine, for a respective timeframe, that a potential interference has occurred by analyzing various types of evidence including the overlap in the track of the object and the track of the vehicle, the quantity of sensor data points within a threshold distance of the track of the vehicle, and the closing velocity of the object relative to the vehicle. This can allow the autonomous vehicle to detect potential interferences without adding further sensor hardware.

Moreover, the autonomous vehicle can filter out ephemeral tracks to avoid analyzing objects (e.g., fog, rain spray) whose interferences are of less concern. This allows the autonomous vehicle to more efficiently utilize its limited onboard processing resources on more substantial objects of interest within its environment.

The technology of the present disclosure also improves the computational confidence that an interference has actually occurred by iteratively analyzing subsequent frames to aggregate interference evidence until it exceeds a threshold level. The higher confidence allows the computing system to avoid computational re-work, improving the overall efficiency of the computing system of the vehicle.

Furthermore, the technology of the present disclosure improves the ability of an autonomous vehicle to control its motion. For example, a motion planner of the autonomous vehicle can ingest an interference alert for consideration when planning the motion of the vehicle. This can allow the autonomous vehicle to more appropriately control the steering, braking, and accelerations systems of the autonomous vehicle, in response to the occurrence of an interference. Ultimately, this can allow the autonomous vehicle to operate more effectively within a testing/simulated environment as well as the real world.

In an aspect, the present disclosure provides an example method. In some implementations, the example method includes obtaining object-track data that indicates a track of an object within an environment of an autonomous vehicle, wherein the track of the object comprises a plurality of points indicating a current location of the object and one or more past locations of the object. In some implementations, the example method includes obtaining autonomous vehicle-track data that indicates a track of the autonomous vehicle in the environment. In some implementations, the example method includes determining that at least a portion of the track of the object overlaps with the track of the autonomous vehicle. In some implementations, the example method includes determining, for a first timeframe, that a threshold quantity of first sensor data points associated with the track of the object are at least partially within a threshold distance of the track of the autonomous vehicle, the first timeframe being associated with the acquisition of the first sensor data points. In some implementations, the example method includes determining, for the first timeframe, the first sensor data points have a threshold closing velocity relative to the autonomous vehicle. In some implementations, the example method includes based on the determination that at least a portion of the track of the object overlaps with the track of the autonomous vehicle, that the threshold quantity of first sensor data points associated with the track of the object is at least partially within the threshold distance of the track of the autonomous vehicle, and the first sensor data points have the threshold closing velocity, determining an occurrence of a potential interference between the object and the autonomous vehicle for the first timeframe. In some implementations, the example method includes providing an indication of the potential interference between the object and the autonomous vehicle for the first timeframe.

In one example aspect, the present disclosure provides an example computing system comprising one or more processors and one or more tangible, non-transitory, computer-readable media that store instructions that are executable by the one or more processors to perform operations of any one or more implementations of the first example method. In some implementations, the computing system is a computing system for controlling an autonomous vehicle, such as an autonomous vehicle control system. In some implementations, the operations include obtaining object-track data that indicates a track of an object within an environment of an autonomous vehicle, wherein the track of the object comprises a plurality of points indicating a current location of the object and one or more past locations of the object. In some implementations, the operations include obtaining autonomous vehicle-track data that indicates a track of the autonomous vehicle in the environment. In some implementations, the operations include determining that at least a portion of the track of the object overlaps with the track of the autonomous vehicle. In some implementations, the operations include determining, for a first timeframe, that a threshold quantity of first sensor data points associated with the track of the object is at least partially within a threshold distance of the track of the autonomous vehicle, the first timeframe being associated with the acquisition of the first sensor data points. In some implementations, the operations include determining, for the first timeframe, the first sensor data points have a threshold closing velocity relative to the autonomous vehicle. In some implementations, the operations include determining, based on the determination that at least a portion of the track of the object overlaps with the track of the autonomous vehicle, that the threshold quantity of first sensor data points associated with the track of the object is at least partially within the threshold distance of the track of the autonomous vehicle, and the first sensor data points have the threshold closing velocity, an occurrence of a potential interference between the object and the autonomous vehicle for the first timeframe. In some implementations, the operations include providing an indication of the potential interference between the object and the autonomous vehicle for the first timeframe.

In an aspect, the present disclosure provides example non-transitory computer readable media storing instructions that are executable by one or more processors to cause a computing system to perform one or more operations of any one or more implementations of the example method. For example, in some implementations, the operations include obtaining object-track data that indicates a track of an object within an environment of an autonomous vehicle, wherein the track of the object comprises a plurality of points indicating a current location of the object and one or more past locations of the object. In some implementations, the operations include obtaining autonomous vehicle-track data that indicates a track of the autonomous vehicle in the environment. In some implementations, the operations include determining that at least a portion of the track of the object overlaps with the track of the autonomous vehicle. In some implementations, the operations include determining, for a first timeframe, that a threshold quantity of first sensor data points associated with the track of the object is at least partially within a threshold distance of the track of the autonomous vehicle, the first timeframe being associated with the acquisition of the first sensor data points. In some implementations, the operations include determining, for the first timeframe, the first sensor data points have a threshold closing velocity relative to the autonomous vehicle. In some implementations, the operations include determining, based on the determination that at least a portion of the track of the object overlaps with the track of the autonomous vehicle, that the threshold quantity of first sensor data points associated with the track of the object is at least partially within the threshold distance of the track of the autonomous vehicle, and the first sensor data points have the threshold closing velocity, an occurrence of a potential interference between the object and the autonomous vehicle for the first timeframe. In some implementations, the operations include providing an indication of the potential interference between the object and the autonomous vehicle for the first timeframe.

Other example aspects of the present disclosure are directed to other systems, methods, vehicles, apparatuses, tangible non-transitory computer-readable media, and devices for performing functions described herein. These and other features, aspects and advantages of various implementations will become better understood with reference to the following description and appended claims.

BRIEF DESCRIPTION OF THE DRAWINGS

The accompanying drawings, which are incorporated in and constitute a part of this specification, illustrate implementations of the present disclosure and, together with the description, serve to explain the related principles.

DETAILED DESCRIPTION

The following describes the technology of this disclosure within the context of an autonomous vehicle for example purposes only. As described herein, the technology described herein is not limited to an autonomous vehicle and can be implemented for or within other autonomous platforms and other computing systems.

An autonomous platform can process data to perceive an environment through which the autonomous platform travels. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

Figure 1:
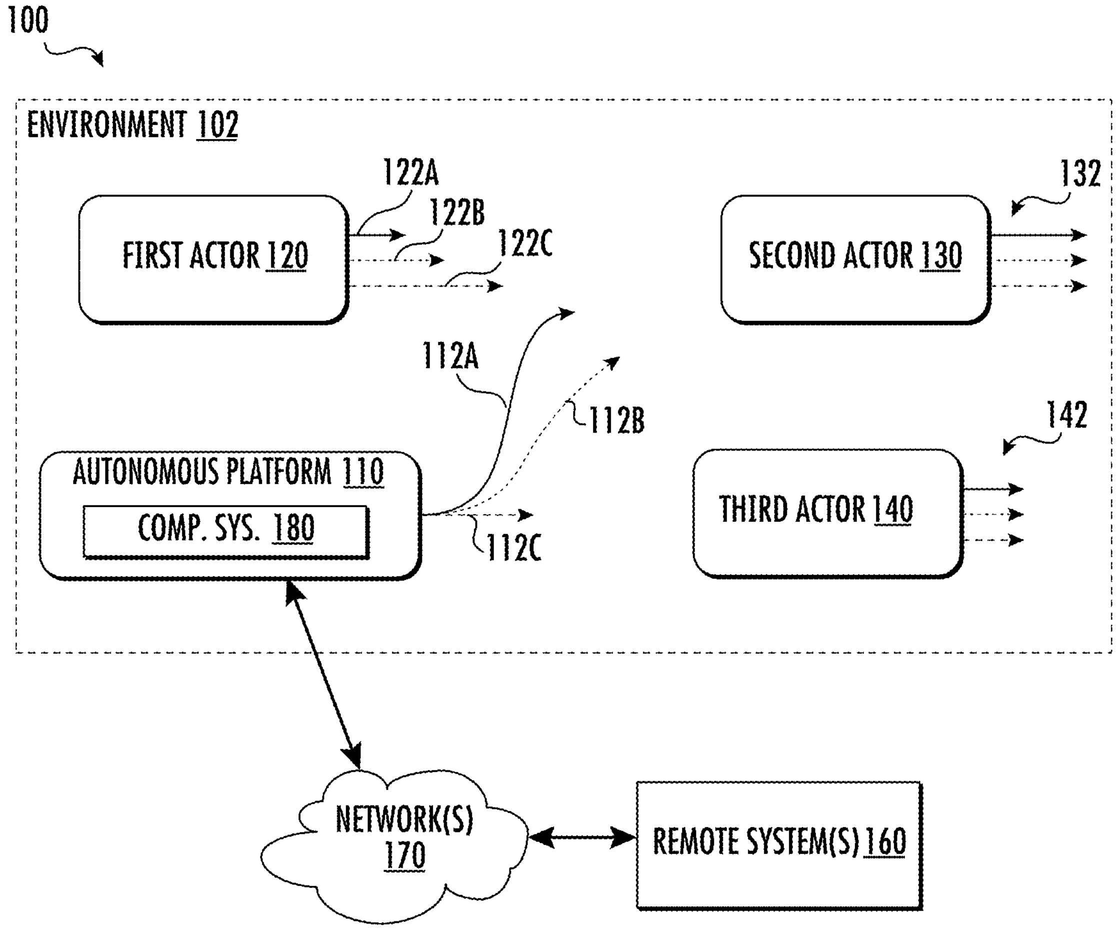
FIG. 1 is a block diagram of an example operational scenario, according to some implementations of the present disclosure.

With reference to FIGS. 1-12, example implementations of the present disclosure are discussed in further detail. FIG. 1 is a block diagram 100 of an example operational scenario, according to some implementations of the present disclosure. In the example operational scenario, an environment 102 contains an autonomous platform 110 and a number of objects, including first actor 120, second actor 130, and third actor 140. In the example operational scenario, the autonomous platform 110 can move through the environment 102 and interact with the object(s) that are located within the environment 102 (e.g., first actor 120, second actor 130, third actor 140, etc.). The autonomous platform 110 can optionally be configured to communicate with remote system(s) 160 through network(s) 170.

The environment 102 may be or include an indoor environment (e.g., within one or more facilities, etc.) or an outdoor environment. An indoor environment, for example, may be an environment enclosed by a structure such as a building (e.g., a service depot, maintenance location, manufacturing facility, etc.). An outdoor environment, for example, may be one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), or other outdoor environments.

The autonomous platform 110 may be any type of platform configured to operate within the environment 102. For example, the autonomous platform 110 may be a vehicle configured to autonomously perceive and operate within the environment 102. The vehicles may be a ground-based autonomous vehicle such as, for example, an autonomous car, truck, van, etc. The autonomous platform 110 may be an autonomous vehicle that can control, be connected to, or be otherwise associated with implements, attachments, and/or accessories for transporting people or cargo. This can include, for example, an autonomous tractor optionally coupled to a cargo trailer. Additionally, or alternatively, the autonomous platform 110 may be any other type of vehicle such as one or more aerial vehicles, water-based vehicles, space-based vehicles, other ground-based vehicles, etc.

The autonomous platform 110 may be configured to communicate with the remote system(s) 160. For instance, the remote system(s) 160 can communicate with the autonomous platform 110 for assistance (e.g., navigation assistance, situation response assistance, etc.), control (e.g., fleet management, remote operation, etc.), maintenance (e.g., updates, monitoring, etc.), or other local or remote tasks. In some implementations, the remote system(s) 160 can provide data indicating tasks that the autonomous platform 110 should perform. For example, as further described herein, the remote system(s) 160 can provide data indicating that the autonomous platform 110 is to perform a trip/service such as a user transportation trip/service, delivery trip/service (e.g., for cargo, freight, items), etc.

The autonomous platform 110 can communicate with the remote system(s) 160 using the network(s) 170. The network(s) 170 can facilitate the transmission of signals (e.g., electronic signals, etc.) or data (e.g., data from a computing device, etc.) and can include any combination of various wired (e.g., twisted pair cable, etc.) or wireless communication mechanisms (e.g., cellular, wireless, satellite, microwave, radio frequency, etc.) or any desired network topology (or topologies). For example, the network(s) 170 can include a local area network (e.g., intranet, etc.), a wide area network (e.g., the Internet, etc.), a wireless LAN network (e.g., through Wi-Fi, etc.), a cellular network, a SATCOM network, a VHF network, an HF network, a WiMAX based network, or any other suitable communications network (or combination thereof) for transmitting data to or from the autonomous platform 110.

As shown for example in FIG. 1, environment 102 can include one or more objects. The object(s) may be objects not in motion or not predicted to move ("static objects") or object(s) in motion or predicted to be in motion ("dynamic objects" or "actors"). In some implementations, the environment 102 can include any number of actor(s) such as, for example, one or more pedestrians, animals, vehicles, etc. The actor(s) can move within the environment according to one or more actor trajectories. For instance, the first actor 120 can move along any one of the first actor trajectories 122A-C, the second actor 130 can move along any one of the second actor trajectories 132, the third actor 140 can move along any one of the third actor trajectories 142, etc.

As further described herein, the autonomous platform 110 can utilize its autonomy system(s) to detect these actors (and their movement) and plan its motion to navigate through the environment 102 according to one or more platform trajectories 112A-C. The autonomous platform 110 can include onboard computing system(s) 180. The onboard computing system(s) 180 can include one or more processors and one or more memory devices. The one or more memory devices can store instructions executable by the one or more processors to cause the one or more processors to perform operations or functions associated with the autonomous platform 110, including implementing its autonomy system (s).

Figure 2:
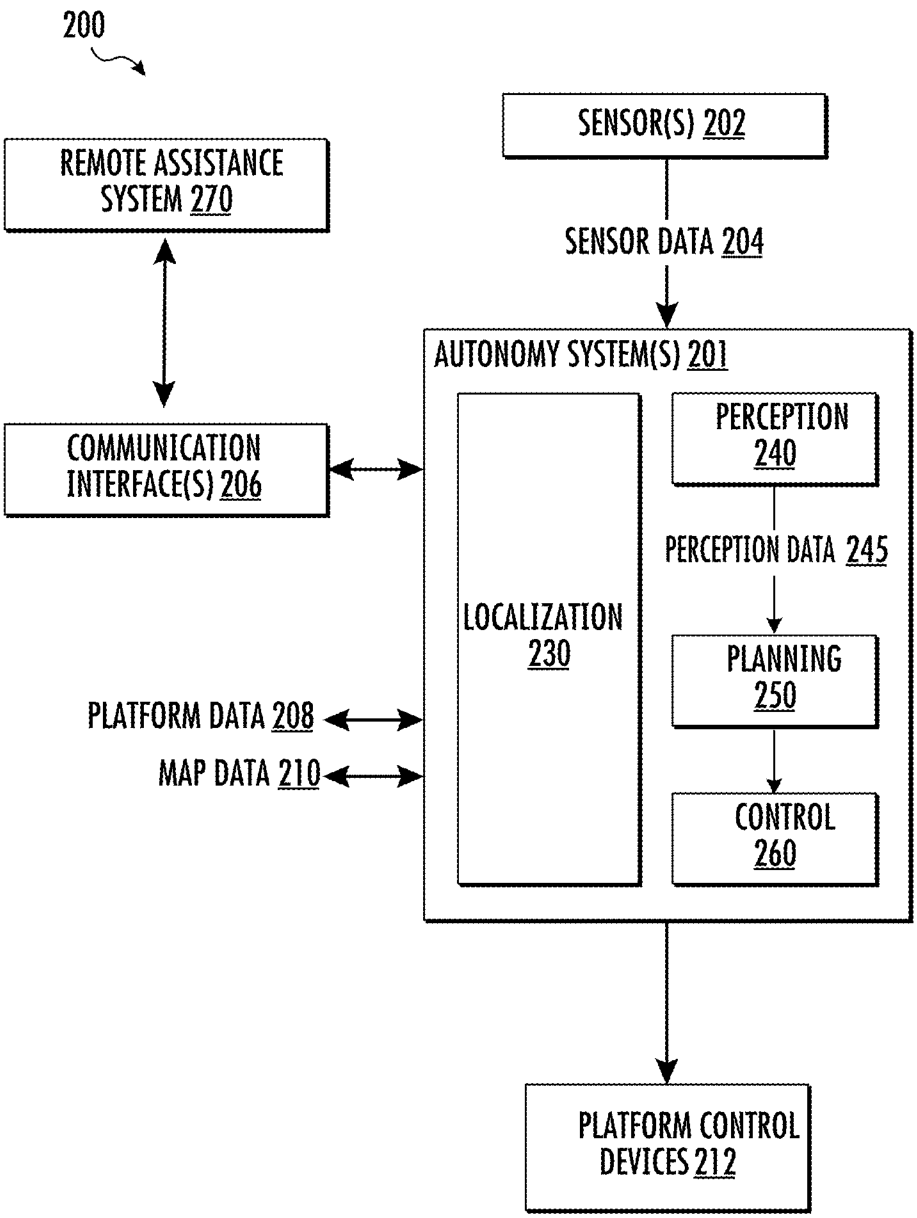
FIG. 2 is a block diagram of an example autonomy system for an autonomous platform, according to some implementations of the present disclosure.

FIG. 2 is a block diagram 200 of an example autonomy system 201 for an autonomous platform, according to some implementations of the present disclosure. In some implementations, the autonomy system 201 can be implemented by a computing system of the autonomous platform (e.g., the onboard computing system(s) 180 of the autonomous platform 110). The autonomy system 201 can operate to obtain inputs from sensor(s) 202 or other input devices. In some implementations, the autonomy system 201 can additionally obtain platform data 208 (e.g., map data 210, route data 211, etc.) from local or remote storage. The autonomy system 201 can generate control outputs for controlling the autonomous platform (e.g., through platform control devices 212, etc.) based on sensor data 204, map data 210, or other data. The autonomy system 201 may include different subsystems for performing various autonomy operations. The subsystems may include a localization system 230, a perception system 240, a planning system 250, and a control system 260. The localization system 230 can determine the location of the autonomous platform within its environment; the perception system 240 can detect, classify, and track objects and actors in the environment; the planning system 250 can determine a trajectory for the autonomous platform; and the control system 260 can translate the trajectory into vehicle controls for controlling the autonomous platform. The autonomy system 201 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the autonomy system 201 can be shared among its subsystems, or a subsystem can have a set of dedicated computing resources.

In some implementations, the autonomy system 201 can be implemented for or by an autonomous vehicle (e.g., a ground-based autonomous vehicle). The autonomy system 201 can perform various processing techniques on inputs (e.g., the sensor data 204, the map data 210) to perceive and understand the vehicle's surrounding environment and generate an appropriate set of control outputs to implement a vehicle motion plan (e.g., including one or more trajectories) for traversing the vehicle's surrounding environment (e.g., environment 102 of FIG. 1, etc.). In some implementations, an autonomous vehicle implementing the autonomy system 201 can drive, navigate, operate, etc. with minimal or no interaction from a human operator (e.g., driver, pilot, etc.).

In some implementations, the autonomous platform can be configured to operate in a plurality of operating modes. For instance, the autonomous platform can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous platform can operate in a semi-autonomous operating mode in which the autonomous platform can operate with some input from a human operator present in the autonomous platform (or a human operator that is remote from the autonomous platform). In some implementations, the autonomous platform can enter into a manual operating mode in which the autonomous platform is fully controllable by a human operator (e.g., human driver, etc.) and can be prohibited or disabled (e.g., temporary, permanently, etc.) from performing autonomous navigation (e.g., autonomous driving, etc.). The autonomous platform can be configured to operate in other modes such as, for example, park or sleep modes (e.g., for use between tasks such as waiting to provide a trip/service, recharging, etc.). In some implementations, the autonomous platform can implement vehicle operating assistance technology (e.g., collision mitigation system, power assist steering, etc.), for example, to help assist the human operator of the autonomous platform (e.g., while in a manual mode, etc.).

Autonomy system 201 can be located onboard (e.g., on or within) an autonomous platform and can be configured to operate the autonomous platform in various environments. The environment may be a real-world environment or a simulated environment. In some implementations, one or more simulation computing devices can simulate one or more of: the sensors 202, the sensor data 204, communication interface(s) 206, the platform data 208, or the platform control devices 212 for simulating operation of the autonomy system 201.

In some implementations, the autonomy system 201 can communicate with one or more networks or other systems with the communication interface(s) 206. The communication interface(s) 206 can include any suitable components for interfacing with one or more network(s) (e.g., the network(s) 170 of FIG. 1, etc.), including, for example, transmitters, receivers, ports, controllers, antennas, or other suitable components that can help facilitate communication. In some implementations, the communication interface(s) 206 can include a plurality of components (e.g., antennas, transmitters, or receivers, etc.) that allow it to implement and utilize various communication techniques (e.g., multiple-input, multiple-output (MIMO) technology, etc.).

In some implementations, the autonomy system 201 can use the communication interface(s) 206 to communicate with one or more computing devices that are remote from the autonomous platform (e.g., the remote system(s) 160) over one or more network(s) (e.g., the network(s) 170). For instance, in some examples, one or more inputs, data, or functionalities of the autonomy system 201 can be supplemented or substituted by a remote system communicating over the communication interface(s) 206. For instance, in some implementations, the map data 210 can be downloaded over a network to a remote system using the communication interface(s) 206. In some examples, one or more of localization system 230, perception system 240, planning system 250, or control system 260 can be updated, influenced, nudged, communicated with, etc. by a remote system for assistance, maintenance, situational response override, management, etc.

The sensor(s) 202 can be located onboard the autonomous platform. In some implementations, the sensor(s) 202 can include one or more types of sensor(s). For instance, one or more sensors can include image capturing device(s) (e.g., visible spectrum cameras, infrared cameras, etc.). Additionally, or alternatively, the sensor(s) 202 can include one or more depth capturing device(s). For example, the sensor(s) 202 can include one or more Light Detection and Ranging (LIDAR) sensor(s) or Radio Detection and Ranging (RADAR) sensor(s). The sensor(s) 202 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 202 for capturing depth information can be fixed to a rotational device in order to rotate the sensor(s) 202 about an axis. The sensor(s) 202 can be rotated about the axis while capturing data in interval sector packets descriptive of different portions of a three-hundred-and-sixty-degree view of a surrounding environment of the autonomous platform. In some implementations, one or more of the sensor(s) 202 for capturing depth information can be solid state.

The sensor(s) 202 can be configured to capture the sensor data 204 indicating or otherwise being associated with at least a portion of the environment of the autonomous platform. The sensor data 204 can include image data (e.g., 2D camera data, video data, etc.), RADAR data, LIDAR data (e.g., 3D point cloud data, etc.), audio data, or other types of data. In some implementations, the autonomy system 201 can obtain input from additional types of sensors, such as inertial measurement units (IMUs), altimeters, inclinometers, odometry devices, location or positioning devices (e.g., GPS, compass), wheel encoders, or other types of sensors. In some implementations, the autonomy system 201 can obtain sensor data 204 associated with particular component(s) or system(s) of an autonomous platform. This sensor data 204 can indicate, for example, wheel speed, component temperatures, steering angle, cargo or passenger status, etc. In some implementations, the autonomy system 201 can obtain sensor data 204 associated with ambient conditions, such as environmental or weather conditions. In some implementations, the sensor data 204 can include multi-modal sensor data. The multi-modal sensor data can be obtained by at least two different types of sensor(s) (e.g., of the sensors 202) and can indicate static object(s) or actor(s) within an environment of the autonomous platform. The multi-modal sensor data can include at least two types of sensor data (e.g., camera and LIDAR data). In some implementations, the autonomous platform can utilize the sensor data 204 for sensors that are remote from (e.g., offboard) the autonomous platform. This can include, for example, sensor data 204 captured by a different autonomous platform.

Map data 210 can describe an environment in which the autonomous platform was, is, or will be located. Map data 210 can provide information about an environment or a geographic area. For example, map data 210 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous platform in understanding its surrounding environment and its relationship thereto. Map data 210 can include ground height information (e.g., terrain mapping). Map data 210 can include high-definition map information. Map data 210 can include sparse map data (e.g., lane graphs, etc.). Sensor data 204 can be fused with or used to update map data 210 in real-time or offline.

Route data 211 can describe one or more goal locations to which the autonomous vehicle is navigating. A route can include a path that includes one or more goal locations. A goal location can be indicated by a map coordinate (e.g., longitude, latitude, or other coordinate system for a map), an address, a vector, etc. A goal location can correspond to a position on a roadway, such as a position within a lane. A goal location can be selected from a continuous or effectively continuous distribution of positions in space or can be selected from a discrete set of positions. For instance, a vector-based map object can provide a continuous distribution of positions from which to select a goal. A high-resolution raster-based map object can provide an effectively continuous distribution of positions from which to select a goal. Example high-resolutions include about 10 cm per pixel, about 5 cm per pixel, or about 1 cm per pixel. A low-resolution map object or a graph-based map object with a number of nodes representing discrete lane positions can provide a discrete distribution of positions from which to select a goal. Example low-resolutions include about 1 m per node, about 3 m per node, or about 5 m per node.

Autonomy systems 201 can process route data 211 to navigate a route. For instance, autonomy systems 201 can process route data 211 to generate instructions for navigating to a next goal location. The instructions for navigating can be explicit, such as designated points at which the vehicle is to exit a highway to enter a surface street. The instructions for navigating can be implicit, such as by encoding the instructions as costs used to bias the vehicle's inherent planning decisions to follow the route.

Localization system 230 can provide an autonomous platform with an understanding of its location and orientation in an environment. In some examples, localization system 230 can support one or more other subsystems of autonomy system 201, such as by providing a unified local reference frame for performing, e.g., perception operations, planning operations, or control operations.

Localization system 230 can determine a current position of the autonomous platform. A current position can include a global position (e.g., respecting a georeferenced anchor, etc.) or relative position (e.g., respecting objects in the environment, etc.). The localization system 230 can generally include or interface with any device or circuitry for analyzing a position or change in position of an autonomous platform (e.g., autonomous ground-based vehicle, etc.). For example, the localization system 230 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous platform can be used by various subsystems of the autonomy system 201 or provided to a remote computing system (e.g., using the communication interface(s) 206).

In some implementations, the localization system 230 can register relative positions of elements of a surrounding environment of an autonomous platform with recorded positions in the map data 210. For instance, the localization system 230 can process the sensor data 204 (e.g., LIDAR data, RADAR data, camera data, etc.) for aligning or otherwise registering to a map of the surrounding environment (e.g., from the map data 210) to understand the autonomous platform's position within that environment. Accordingly, in some implementations, the autonomous platform can identify its position within the surrounding environment (e.g., across six axes, etc.) based on a search over the map data 210. In some implementations, given an initial location, the localization system 230 can update the location of the autonomous platform 110's location with incremental re-alignment based on recorded or estimated deviations from the initial location. In some implementations, a position can be registered directly within the map data 210.

In some implementations, the map data 210 can include a large volume of data subdivided into geographic tiles, such that a desired region of a map stored in the map data 210 can be reconstructed from one or more tiles. For instance, a plurality of tiles selected from the map data 210 can be stitched together by the autonomy system 201 based on a position obtained by the localization system 230 (e.g., a number of tiles selected in the vicinity of the position).

In some implementations, the localization system 230 can determine positions (e.g., relative or absolute) of one or more attachments or accessories for an autonomous platform. For instance, an autonomous platform can be associated with a cargo platform, and the localization system 230 can provide positions of one or more points on the cargo platform. For example, a cargo platform can include a trailer or other device towed or otherwise attached to or manipulated by an autonomous platform 110, and the localization system 230 can provide for data describing the position (e.g., absolute, relative, etc.) of the autonomous platform as well as the cargo platform. Such information can be obtained by the other autonomy systems to help operate the autonomous platform 110.

The autonomy system 201 can include the perception system 240, which can allow an autonomous platform 110 to detect, classify, and track objects and actors in its environment. Environmental features or objects perceived within an environment 102 can be those within the field of view of the sensor(s) 202 or predicted to be occluded from the sensor(s) 202. This can include object(s) not in motion or not predicted to move (static objects) or object(s) in motion or predicted to be in motion (dynamic objects/actors).

The perception system 240 can determine one or more states (e.g., current or past state(s), etc.) of one or more objects that are within a surrounding environment of an autonomous platform. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information; or any combination thereof. In some implementations, the perception system 240 can determine the state(s) using one or more algorithms or machine-learned models configured to identify/classify objects based on inputs from the sensor(s) 202. The perception system can use different modalities of the sensor data 204 to generate a representation of the environment to be processed by the one or more algorithms or machine-learned models. In some implementations, state(s) for one or more identified or unidentified objects can be maintained and updated over time as the autonomous platform 110 continues to perceive or interact with the objects (e.g., maneuver with or around, yield to, etc.). In this manner, the perception system 240 can provide an understanding about a current state of an environment (e.g., including the objects therein, etc.) informed by a record of prior states of the environment (e.g., including movement histories for the objects therein). Such information can be output as perception data 245. Perception data 245 can be used by various other systems of the autonomous platform (e.g., localization system 230, planning system 250, etc.) as it plans its motion through the environment 102.

The autonomy system 201 can include the planning system 250, which can be configured to determine how the autonomous platform 110 is to interact with and move within its environment. The planning system 250 can determine one or more motion plans for an autonomous platform 110. A motion plan can include one or more trajectories (e.g., motion trajectories) that indicate a path for an autonomous platform 110 to follow. A trajectory can be of a certain length or time range. The length or time range can be defined by the computational planning horizon of the planning system 250.

The computational planning horizon can refer to the time range or length over which the planning system of an autonomous platform 110 generates and evaluates motion trajectories. It can define the span of future events or positions that the system considers when determining how the vehicle should interact with and move through its environment 102. A motion trajectory can be defined by one or more waypoints (with associated coordinates). The waypoint(s) can be future location(s) for the autonomous platform. The motion plans can be continuously generated, updated, and considered by the planning system 250.

The motion planning system 250 can determine a strategy for the autonomous platform 110. A strategy may include a set of discrete decisions (e.g., yield to actor, reverse yield to actor, merge, lane change) that the autonomous platform makes. The strategy may be selected from a plurality of potential strategies. The selected strategy may be a lowest cost strategy as determined by one or more cost functions. The cost functions may, for example, evaluate the probability of a collision with another actor or object.

The planning system 250 can determine a desired trajectory for executing a strategy. For instance, the planning system 250 can obtain one or more trajectories for executing one or more strategies. The planning system 250 can evaluate trajectories or strategies (e.g., with scores, costs, rewards, constraints, etc.) and rank them. For instance, the planning system 250 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 250 can utilize static cost(s) to evaluate trajectories for the autonomous platform (e.g., "avoid lane boundaries," "minimize jerk," etc.). Additionally, or alternatively, the planning system 250 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 250 can rank trajectories based on one or more static costs, one or more dynamic costs, or a combination thereof. The planning system 250 can select a motion plan (and a corresponding trajectory) based on a ranking of a plurality of candidate trajectories. In some implementations, the planning system 250 can select a highest ranked candidate, or a highest ranked feasible candidate.

The planning system 250 can then validate the selected trajectory against one or more constraints before the trajectory is executed by the autonomous platform 110.

To help with its motion planning decisions, the planning system 250 can be configured to perform a forecasting function. The planning system 250 can forecast future state(s) of the environment. This can include forecasting the future state(s) of other actors in the environment. In some implementations, the planning system 250 can forecast future state(s) based on current or past state(s) (e.g., as developed or maintained by the perception system 240). In some implementations, future state(s) can be or include one or more forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous platform 110. Additionally, or alternatively, the probabilities can include probabilities conditioned on trajectory options available to one or more other actors.

In some implementations, the planning system 250 can perform interactive forecasting. The planning system 250 can determine a motion plan for an autonomous platform 110 with an understanding of how forecasted future states of the environment 102 can be affected by execution of one or more candidate motion plans.

By way of example, with reference again to FIG. 1, the autonomous platform 110 can determine candidate motion plans corresponding to a set of platform trajectories 112A-C that respectively correspond to the first actor trajectories 122A-C for the first actor 120, trajectories 132 for the second actor 130, and trajectories 142 for the third actor 140 (e.g., with respective trajectory correspondence indicated with matching line styles). The autonomous platform 110 can evaluate each of the potential platform trajectories and predict its impact on the environment.

For example, the autonomous platform 110 (e.g., using its autonomy system 201) can determine that a platform trajectory 112A would move the autonomous platform 110 more quickly into the area in front of the first actor 120 and is likely to cause the first actor 120 to decrease its forward speed and yield more quickly to the autonomous platform 110 in accordance with a first actor trajectory 122A.

Additionally, or alternatively, the autonomous platform 110 can determine that a platform trajectory 112B would move the autonomous platform 110 gently into the area in front of the first actor 120 and, thus, may cause the first actor 120 to slightly decrease its speed and yield slowly to the autonomous platform 110 in accordance with a first actor trajectory 122B.

Additionally, or alternatively, the autonomous platform 110 can determine that a platform trajectory 112C would cause the autonomous vehicle to remain in a parallel alignment with the first actor 120 and, thus, the first actor 120 is unlikely to yield any distance to the autonomous platform 110 in accordance with first actor trajectory 122C.

Based on comparison of the forecasted scenarios to a set of desired outcomes (e.g., by scoring scenarios based on a cost or reward), the planning system 250 can select a motion plan (and its associated trajectory) in view of the autonomous platform's interaction with the environment 102. In this manner, for example, the autonomous platform 110 can achieve at least a technical improvement that interleaves its forecasting and motion planning functionality.

To implement selected motion plan(s), the autonomy system 201 can include a control system 260 (e.g., a vehicle control system). Generally, the control system 260 can provide an interface between the autonomy system 201 and the platform control devices 212 for implementing the strategies and motion plan(s) generated by the planning system 250. For instance, control system 260 can implement the selected motion plan/trajectory to control motion of the autonomous platform 110 through its environment 102 by following the selected trajectory (e.g., the waypoints included therein). The control system 260 can, for example, translate a motion plan into instructions for the appropriate platform control devices 212 (e.g., acceleration control, brake control, steering control, etc.). By way of example, the control system 260 can translate a selected motion plan into instructions to adjust a steering component (e.g., a steering angle) by a certain number of degrees, apply a certain magnitude of braking force, increase/decrease speed, etc. In some implementations, the control system 260 can communicate with the platform control devices 212 through communication channels including, for example, one or more data buses (e.g., controller area network (CAN), etc.), onboard diagnostics connectors (e.g., OBD-II, etc.), or a combination of wired or wireless communication links. The platform control devices 212 can send or obtain data, messages, signals, etc. to or from the autonomy system 201 (or vice versa) through the communication channel(s).

The autonomy system 201 can receive, through communication interface(s) 206, assistive signal(s) from remote assistance system 270. Remote assistance system 270 can communicate with the autonomy system 201 over a network (e.g., as a remote system 160 over network 170). In some implementations, the autonomy system 201 can initiate a communication session with the remote assistance system 270. For example, the autonomy system 201 can initiate a session based on or in response to a trigger. In some implementations, the trigger may be an alert, an error signal, a map feature, a request, a location, a traffic condition, a road condition, etc.

After initiating the session, the autonomy system 201 can provide context data to the remote assistance system 270. The context data may include sensor data 204 and state data of the autonomous platform. For example, the context data may include a live camera feed from a camera of the autonomous platform 110 and a current speed of the autonomous platform 110. An operator (e.g., human operator) of the remote assistance system 270 can use the context data to select one or more assistive signals. The assistive signal(s) can provide values or adjustments for various operational parameters or characteristics for the autonomy system 201. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the autonomy system 201.

Autonomy system 201 can use the assistive signal(s) for input into one or more autonomy subsystems for performing autonomy functions. For instance, the planning system 250 can receive the assistive signal(s) as an input for generating a motion plan. For example, assistive signal(s) can include constraints for generating a motion plan. Additionally, or alternatively, assistive signal(s) can include cost or reward adjustments for influencing motion planning by the planning system 250. Additionally, or alternatively, assistive signal(s) can be considered by the autonomy system 201 as suggestive inputs for consideration in addition to other received data (e.g., sensor inputs, etc.).

The autonomy system 201 may be platform agnostic, and the control system 260 can provide control instructions to platform control devices 212 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 3A:
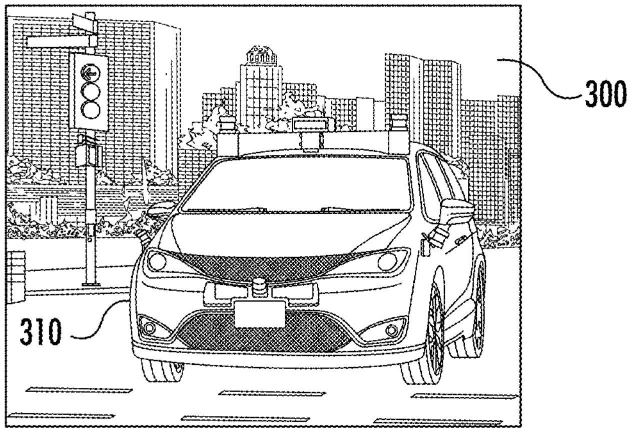
FIG. 3A is a representation of an example operational environment, according to some implementations of the present disclosure.

For example, with reference to FIG. 3A, an operational environment 300 can include a dense environment. An autonomous platform can include an autonomous vehicle 310 controlled by the autonomy system 201. In some implementations, the autonomous vehicle 310 can be configured for maneuverability in a dense environment, such as with a configured wheelbase or other specifications. In some implementations, the autonomous vehicle 310 can be configured for transporting cargo or passengers. In some implementations, the autonomous vehicle 310 can be configured to transport numerous passengers (e.g., a passenger van, a shuttle, a bus, etc.). In some implementations, the autonomous vehicle 310 can be configured to transport cargo, such as large quantities of cargo (e.g., a truck, a box van, a step van, etc.) or smaller cargo (e.g., food, personal packages, etc.).

Figure 3B:
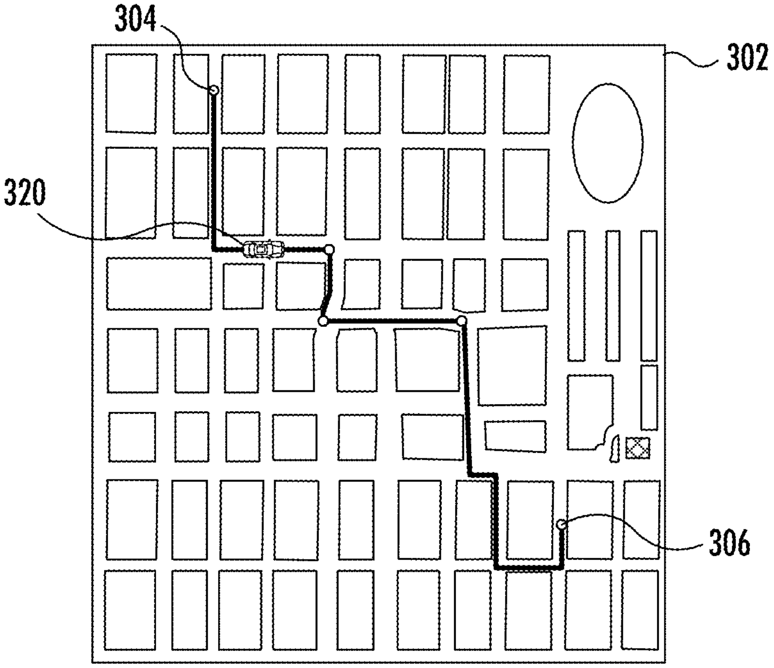
FIG. 3B is a representation of an example map of an operational environment, according to some implementations of the present disclosure.

With reference to FIG. 3B, a selected overhead view 302 of the operational environment 300 is shown overlaid with an example trip/service between a first location 304 and a second location 306. The example trip/service can be assigned, for example, to an autonomous vehicle 320 by a remote computing system. The autonomous vehicle 320 can be, for example, the same type of vehicle as autonomous vehicle 310. The example trip/service can include transporting passengers or cargo between the first location 304 and the second location 306. In some implementations, the example trip/service can include travel to or through one or more intermediate locations, such as to onload or offload passengers or cargo. In some implementations, the example trip/service can be prescheduled (e.g., for regular traversal, such as on a transportation schedule). In some implementations, the example trip/service can be on-demand (e.g., as requested by or for performing a taxi, rideshare, ride hailing, courier, delivery service, etc.).

Figure 3C:
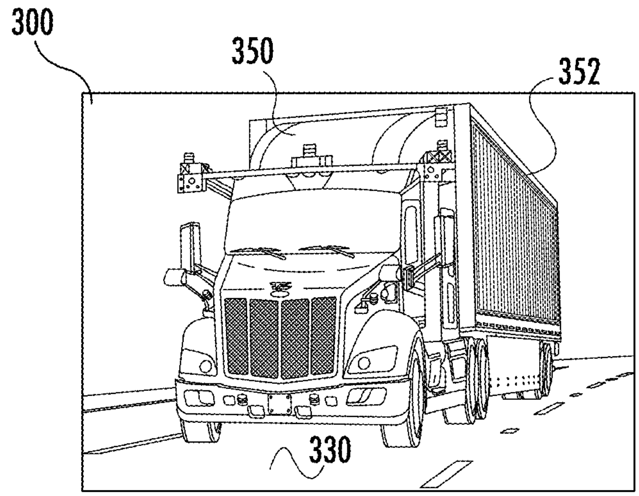
FIG. 3C is a representation of an example operational environment, according to some implementations of the present disclosure.

With reference to FIG. 3C, in another example, an operational environment 300 can include an open travel way environment 330. An autonomous platform can include an autonomous vehicle 350 controlled by the autonomy system 201. This can include an autonomous tractor for an autonomous truck. In some implementations, the autonomous vehicle 350 can be configured for high payload transport (e.g., transporting freight or other cargo or passengers in quantity), such as for long distance, high payload transport. For instance, the autonomous vehicle 350 can include one or more cargo platform attachments such as a trailer 352. Although depicted as a towed attachment in FIG. 3C, in some implementations one or more cargo platforms can be integrated into (e.g., attached to the chassis of, etc.) the autonomous vehicle 350 (e.g., as in a box van, step van, etc.).

Figure 3D:
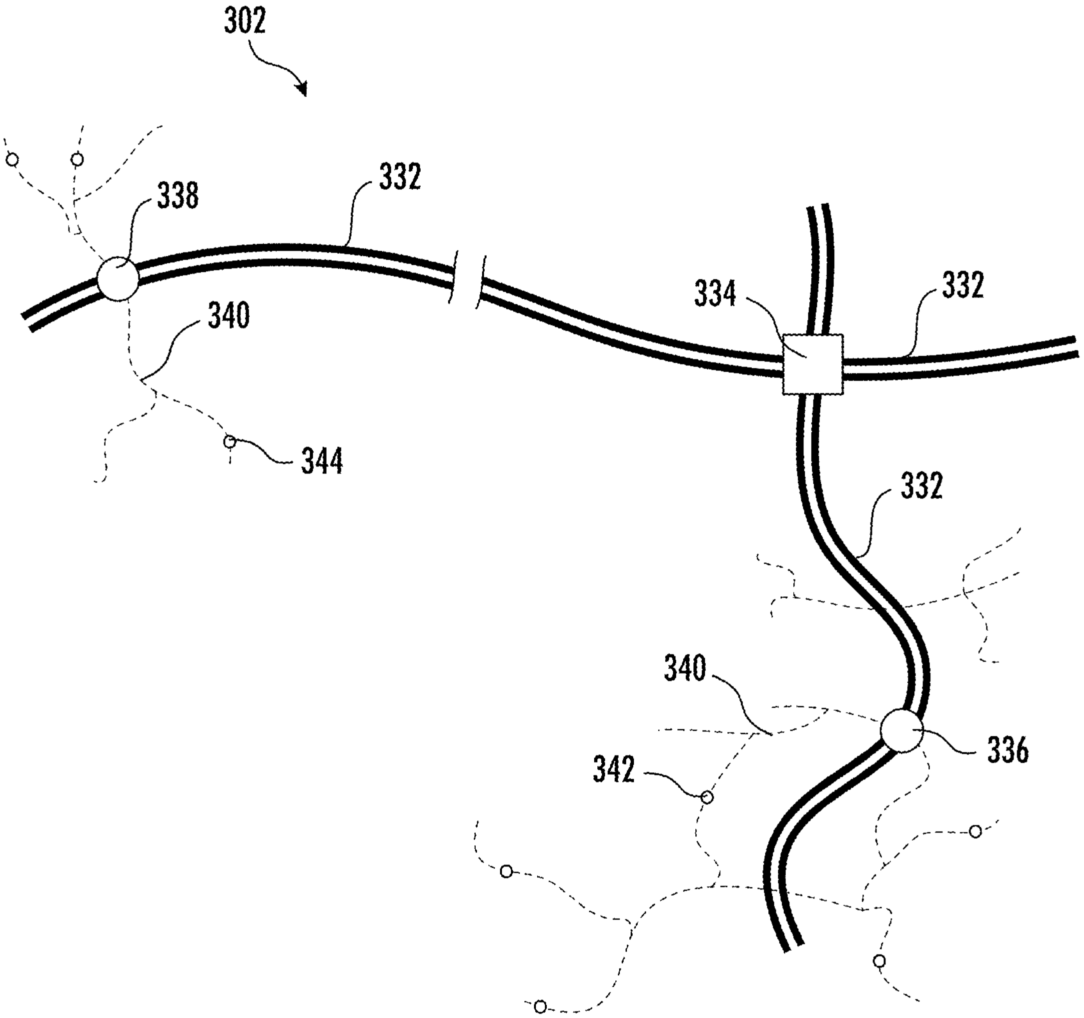
FIG. 3D is a representation of an example map of an operational environment, according to some implementations of the present disclosure.

With reference to FIG. 3D, a selected overhead view 302 of open travel way environment 330 is shown, including travel ways 332, an interchange 334, transfer hubs 336 and 338, access travel ways 340, and locations 342 and 344. In some implementations, an autonomous vehicle (e.g., the autonomous vehicle 310 or the autonomous vehicle 350) can be assigned an example trip/service to traverse the one or more travel ways 332 (optionally connected by the interchange 334) to transport cargo between the transfer hub 336 and the transfer hub 338. For instance, in some implementations, the example trip/service includes a cargo delivery/transport service, such as a freight delivery/transport service. The example trip/service can be assigned by a remote computing system. In some implementations, the transfer hub 336 can be an origin point for cargo (e.g., a depot, a warehouse, a facility, etc.) and the transfer hub 338 can be a destination point for cargo (e.g., a retailer, etc.). However, in some implementations, the transfer hub 336 can be an intermediate point along a cargo item's ultimate journey between its respective origin and its respective destination. For instance, a cargo item's origin can be situated along the access travel ways 340 at the location 342. The cargo item can accordingly be transported to transfer hub 336 (e.g., by a human-driven vehicle, by the autonomous vehicle 310, etc.) for staging. At the transfer hub 336, various cargo items can be grouped or staged for longer distance transport over the travel ways 332.

In some implementations of an example trip/service, a group of staged cargo items can be loaded onto an autonomous vehicle (e.g., the autonomous vehicle 350) for transport to one or more other transfer hubs, such as the transfer hub 338. For instance, although not depicted, it is to be understood that the open travel way environment 330 can include more transfer hubs than the transfer hubs 336 and 338 and can include more travel ways 332 interconnected by more interchanges 334. A simplified map is presented here for purposes of clarity only. In some implementations, one or more cargo items transported to the transfer hub 338 can be distributed to one or more local destinations (e.g., by a human-driven vehicle, by the autonomous vehicle 310, etc.), such as along the access travel ways 340 to the location 344. In some implementations, the example trip/service can be prescheduled (e.g., for regular traversal, such as on a transportation schedule). In some implementations, the example trip/service can be on-demand (e.g., as requested by or for performing a chartered passenger transport or freight delivery service).

To improve the operation of autonomous platforms, such as an autonomous vehicle (e.g., autonomous platform 110) controlled at least in part using autonomy system 201 (e.g., the autonomous vehicles 310 or 350), example aspects of the present disclosure provide improved object perception, tracking, and motion planning systems and techniques.

Figure 4:
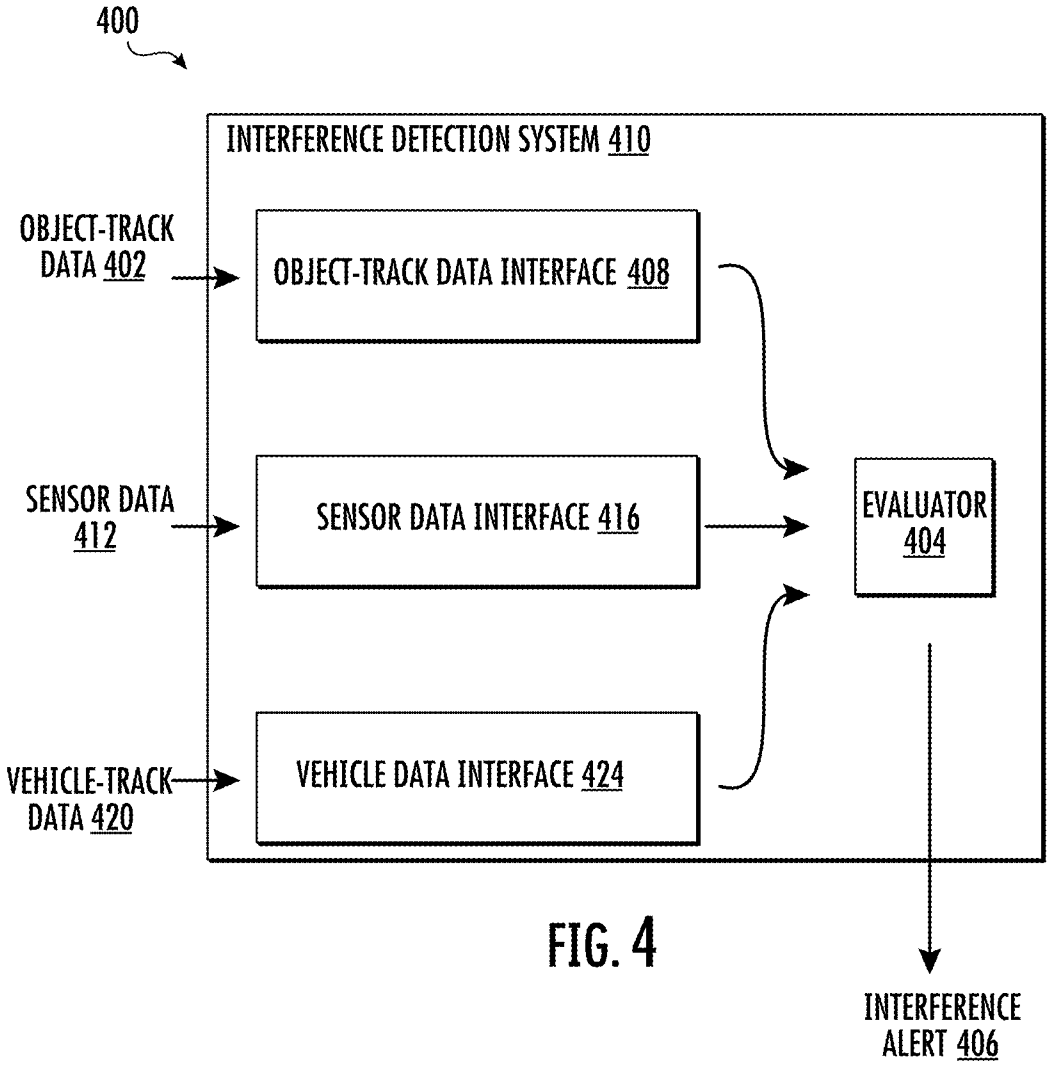
FIG. 4 is a block diagram of an example interference detection system according to example implementations of the present disclosure.

FIG. 4 is a block diagram 400 of an example interference detection system 410 according to example implementations of the present disclosure. Interference detection system 410 may be an example implementation of planning system 250 and/or control system 260. The interference detection system 410 may include an object-tracking data interface 408, a sensor data interface 416, a vehicle data interface 424, and an evaluator 404. The evaluator 404 may obtain input data, such as object-tracking data 402, sensor data 412, or vehicle-track data 420 (also referred to herein as "autonomous vehicle-track data 420") via the respective object-tracking data interface 408, the sensor data interface 416, or the vehicle data interface 424.

The data interfaces of the interference detection system 410 may include computing hardware that is structured to allow different systems or components (e.g., of the autonomous vehicle 350) to communicate and exchange information with the interference detection system 410. The data interfaces may define the methods and protocols through which data may be sent and received.

Evaluator 404 may use the object-tracking data interface 408, the sensor data interface 416, or the vehicle data interface 424 to generate an interference alert 406. The evaluator 404 may output interference alert 406 for candidate trajectories. As further described herein, the autonomous vehicle 350 may use the interference alert 406 to modify a trajectory of the autonomous vehicle 350. Additionally, or alternatively, the interference detection system 410 may transmit the interference alert 406 to a remote computing device (not shown).

The sensor data interface 416 of the interference detection system 410 may be structured to obtain sensor data 412. The sensor data 412 may be indicative of one or more objects within the environment 330 of the autonomous vehicle 350. The sensor data 412 may include any of the sensor data described herein including audio data or IMU data.

The sensor data 412 can be associated with one or more timeframes. The timeframes may be associated with the acquisition of the sensor data 412. Acquisition may include capturing raw sensor data at that timeframe or acquiring processed sensor data at that timeframe. The acquisition may be from the autonomous vehicle, the sensor suite of the autonomous vehicle, a computing system onboard the autonomous vehicle, or remote system that provides the sensor data 412 to the autonomous vehicle.

The interference detection system 410 may associate a timeframe with the received sensor data 412. For example, the sensor data 412 may include LIDAR data. A first timeframe may be associated with a first LIDAR sweep of a LIDAR system of the autonomous vehicle 350, and a second timeframe may be associated with a second LIDAR sweep of the LIDAR system. The second LIDAR sweep may occur after the first LIDAR sweep. Each portion of LIDAR data may correspond to a point cloud that includes a slice of point clouds represented in a shape (e.g., frustum). In some embodiments, the determinations made by the evaluator 404 may determine whether a LIDAR sweep that is visible in the frustum has an active interference with the autonomous vehicle 350. Possible interferences may be stored on a per-object map that may be published in the interference alert 406.

In another example, the sensor data 412 may include image data. For instance, first image data may be captured by one or more cameras onboard the autonomous vehicle 350 at a first timeframe. Second image data may be captured by one or more cameras onboard the autonomous vehicle 350 at a second timeframe, after the first timeframe. The first timeframe may be associated with a time period when the first image data was acquired and the second timeframe may be associated with a time period when the second image data was acquired.

Additionally, or alternatively, the interference detection system 410 may record the corresponding timeframes for receiving the object-track data 402 or the vehicle-track data 420. For example, the interference detection system 410 may generate metadata for the object-track data 402 or the vehicle-track data 420 that identifies the corresponding timeframe for that portion of the object track or vehicle track. The timeframe may be based on a timestep associated with the position of the track or when the underlying sensor data 412 used to generate the track was acquired.

The interference detection system 410 may obtain (e.g., via the object-track data interface 408) object-track data 402. The object-track data 402 may indicate a track of an object within an environment 330 of an autonomous vehicle 350. The track of the object may include a plurality of points indicating a current location of the object. Additionally, or alternatively, the track may indicate one or more past locations of the object. The points may correspond to a plurality of bounding shapes (e.g., bounding boxes) indicating a current location or one or more past locations of the object.

The interference detection system 410 may obtain (e.g., via the vehicle data interface 424) vehicle-track data 420. The vehicle-track data 420 may indicate a track of the autonomous vehicle 350 in the environment 330. As described herein, the track of the autonomous vehicle 350 may indicate one or more bounding shapes of the autonomous vehicle 350 and one or more positions of the autonomous vehicle 350. The bounding shape may represent a shape and a spatial boundary of the autonomous vehicle 350. The spatial boundary may include a buffer distance that is offset from the exterior surface of the autonomous vehicle 350. For an example autonomous truck, the track may include an autonomous tractor. The autonomous tractor may pull a trailer. The track of the autonomous truck may include a rectangle indicating a spatial boundary of the autonomous tractor and a rectangle for the trailer being pulled by the tractor, if any.

The evaluator 404 may be structured to determine that a potential interference between an object and an autonomous vehicle 350 has occurred, is occurring, or is about to occur. The determination of the potential interference may be based on one or more factors. For example, the evaluator 404 may determine the potential interference based on, at least one of: a determination that at least a portion of the track of the object overlaps (e.g., at least partially) with the track of the autonomous vehicle 350, that the threshold quantity of first sensor data points associated with the track of the object is at least partially within a threshold distance of the track of the autonomous vehicle 350, or that the first sensor data points have the threshold closing velocity.

The evaluator 404 may determine that at least a portion of the track of the object overlaps with the track of the autonomous vehicle 350 based on a comparison of the object and vehicle tracks. For example, the evaluator 404 may compare the object-track data 402 with the vehicle-track data 420. Based on the comparison, the evaluator 404 may determine that the track of the object at least partially overlaps with the track of the autonomous vehicle 305. As described herein, two tracks may be considered to overlap in the event at least a portion of the bounding shape of the object coincides with (e.g., is located in a same position, at a concurrent time as) at least a portion of the bounding shape of the autonomous vehicle 350. Additionally, or alternatively, two tracks may be considered to overlap in the event that at least a portion of the bounding shape of the object falls within the interior region created by the bounding shape of the autonomous vehicle 350, or vice versa. Such overlap may indicate that the object (e.g., test object) is within a buffer distance from the autonomous vehicle 350 and, potentially, colliding with the autonomous vehicle 350.

In some embodiments, the evaluator 404 may determine that the track of the object is not an ephemeral track. An ephemeral track can represent a temporary or transient track that appears briefly and then disappears. This may suggest that the track is not a real, persistent object in the environment 300. Ephemeral tracks may be caused by noise, reflections, or other non-object-related phenomena that the interference detection system 410 detects but which do not represent an actual object on which the interference detection system 410 should dedicate resources.

The interference detection system 410 may determine an ephemeral track by one or more factors, such as the duration or consistency of the track, a spatial correlation of the track, and/or an environmental context associated with the track. For example, tracks that appear for less than a threshold number of frames or seconds or do not show consistency in their position, velocity, or shape across consecutive frames may be determined ephemeral. Additionally, or alternatively, if a behavior (e.g., speed, direction) of a track is erratic (e.g., not a smooth trajectory) or does not follow a physical path typical for objects in the scene, the evaluator 404 may determine that the track is ephemeral. In some embodiments, if the track fails to correlate spatially with data from other sensors 202 (e.g., from a camera or radar) or doesn't correspond with expected objects (e.g., vehicles, pedestrians, and/or static infrastructure), the evaluator 404 may determine that the track is ephemeral. In some configurations, a track may appear near reflective surfaces (e.g., glass buildings, water bodies) due to LIDAR reflections and can be identified as ephemeral. This may occur, for example, in rain, fog, snow, or other environmental events. Example ephemeral tracks may include raindrops, reflections, dust, leaves, small debris moving through the air, or other small, transient, or otherwise inconsequential tracks may be ephemeral tracks. The evaluator 404 may be configured to ignore or discard ephemeral tracks.

In some embodiments, the interference detection system 410 may filter out ephemeral objects/tracks based on a height threshold. For example, the interference detection system 410 may be structured (e.g., programmed) to discard any objects (and corresponding object tracks) that do not meet or exceed a threshold height (e.g., 5, 7, 10 . . . cm) above the ground level.

The evaluator 404 may determine that one or more data points associated with a track of an object are within a threshold distance of a track of the autonomous vehicle 350. The threshold distance may include a buffer distance (e.g., 0.25, 0.5, 1.0, 1.5, 2 m) from an exterior surface of the autonomous vehicle 350. A buffer distance may refer to a distance from the actual exterior of the autonomous vehicle 350 to a bounding shape thereof (e.g., a spatial boundary corresponding to an estimated or represented shape of a particular track). Thus, when an interference is calculated, it may be because a target track appears to intersect with a portion of a bounding shape. This may or may not mean that the object actually intersects with the actual exterior of the autonomous vehicle 350.

The evaluator 404 may determine, for a first timeframe, that a threshold quantity of first sensor data points associated with the track of the object are at least partially within a threshold distance of the track of the autonomous vehicle 350. The received sensor data 412 may include the first sensor data points. The first timeframe may be associated with an acquisition of the first sensor data points. The threshold quantity of sensor data points may be 1, 2, 3, 5, 7, 8, 10, 12, 15, about 20, about 30, about 40, about 50, about 60, about 75, about 80, about 90, about 100, about 120, about 135, about 150, about 200, about 250, about 400, about 500, about 750, any number of data points therein, or fall within a range of data points having endpoints therein. Additionally, or alternatively, the threshold distance may be about 1 mm, about 3 mm, about 5 mm, about 1 cm, about 2 cm, about 4 cm, about 5 cm, about 7 cm, about 10 cm, about 12 cm, about 15 cm, about 18 cm, about 20 cm, about 25 cm, about 30 cm, about 40 cm, about 50 cm, about 75 cm, about 100 cm, about 125 cm, about 150 cm, any distance therein, or fall within any range of distance having endpoints therein.

The evaluator 404 may use the sensor data 412 to determine that a number of first sensor data points associated with the track of the object (e.g., the object-track data 402) that are at least partially within a threshold distance of the track of the autonomous vehicle 350 satisfies a threshold quantity. The term "satisfies" can mean "meets or exceeds."

For example, the evaluator 404 may be structured to identify the quantity of first sensor data points that are at least partially within the threshold distance, for the first timeframe. By way of example, each of the first sensor data points may include coordinates or another type of location identifier. The evaluator 404 may process the coordinates for each of the first sensor data points and compare it with the threshold distance from the coordinates of the vehicle track. The evaluator 404 may be structured to perform a counting function, increasing a counter each time a first sensor data point is determined to be within the threshold distance. The evaluator 404 may be structured to provide an indication when the quantity of first sensor data points within the threshold distance meets or exceeds the threshold quantity. This can include generating a flag within a record or data structure indicating the satisfaction of the threshold quantity.

The evaluator 404 may be structured to determine a closing velocity of an object. The evaluator 404 may determine the closing velocity based on the sensor data 412. For example, the evaluator 404 may determine a centroid of the first sensor data points at the first timeframe. The evaluator 404 may determine a first closing velocity of the object based on the centroid of the first sensor data points associated with the object. The evaluator 404 may determine that a centroid of the first sensor data points (e.g., LIDAR point cloud) has a positive closing speed relative to the autonomous vehicle 350, which can indicate that the centroid and the autonomous vehicle 350 are moving closer to each other.

The evaluator 404 may determine that the closing velocity satisfies a threshold closing velocity. The closing velocity threshold may be about 0.1 m/s, 0.15 m/s, 0.35 m/s, 0.5 m/s, 0.75 m/s, 1 m/s, 2 m/s, about 5 m/s, about 8 m/s, about 10 m/s, about 12 m/s, about 15 m/s, about 20 m/s, about 25 m/s, about 30 m/s, about 35 m/s, about 40 m/s, any speed therein, or fall within a range having endpoints therein. The threshold closing velocity may include a positive velocity indicating that the centroid of the first sensor data points is moving toward the autonomous vehicle 350.

The interference detection system 410 may provide an indication of the potential interference between the object and the autonomous vehicle 350 within a given timeframe. The indication may include an alert, a report, data packet, encoded signal, or one or more details about the determined potential interference. For example, the interference detection system 410 may generate a data packet that indicates the existence of the potential interference (e.g., represented by a value or character), the timeframe (e.g., t1, t2), and an identifier of the object (e.g., represented by values/characters). The data packet may be provided to a counter that aggregates the number of potential interferences detected for a particular object over a plurality of timeframes. The counter may be structured to increase a count associated with the particular object, each time the counter obtains a data packet indicating that a potential interference exists with that object for a respective timeframe.

The counter can maintain a record that indicates the objects that are perceived within the environment of the autonomous vehicle 350. The record can include, for example, a table with a row for each object and a column for each timeframe, or vice versa. Cells may include data entries indicating the existence of a potential interference with the object for the associated timeframe. A row/column for a particular object may be initially written based on the initial determination that the track of the object overlaps with the track of the autonomous vehicle. The data entries for a particular object may be erased/removed when the overlap ceases, the object is determined to be ephemeral, or the object track ceases being updated.

In some embodiments, the interference detection system 410 may determine a potential interference at a second timeframe. The second timeframe may be associated with the acquisition of the second sensor data 412 points. For instance, the second timeframe may correspond to a time when the second sensor data 412 points are acquired. This may include, for example, when a second sweep of LIDAR data is acquired or processed by the autonomous vehicle 350.

The evaluator 404 may determine, for a second timeframe that is subsequent to a first timeframe, that a threshold quantity of second sensor data 412 points associated with the object is at least partially within the threshold distance of the track of the autonomous vehicle 350. This computation may be performed in a similar manner as that described herein for the first timeframe.

The evaluator 404 may determine, for the second timeframe, that the second sensor data points (e.g., a centroid thereof) have a threshold closing velocity relative to the autonomous vehicle 350. The evaluation of the closing velocity for the second sensor data points may be performed in a similar manner as that described herein for the first timeframe.

Based on the determination that the threshold quantity of second sensor data 412 points is at least partially within the threshold distance of the track of the autonomous vehicle 350, and that the second sensor data points satisfy the threshold closing velocity, the evaluator 404 may determine an occurrence of a potential interference between the object and the autonomous vehicle 350 for the second timeframe. The interference detection system 410 may provide an indication of the potential interference between the object and the autonomous vehicle 350 for the second timeframe.

The interference detection system 410 may be structured to determine that an interference between an object and the autonomous vehicle 350 has occurred based on the aggregation of multiple potential interference indications across a plurality of timeframes. For example, the evaluator 404 may determine that the interference has occurred based on the indication of the potential interference between the object and the autonomous vehicle 350 for the first timeframe and the indication of the potential interference between the object and the autonomous vehicle 350 for the second timeframe. The interference detection system 410 may generate an interference alert 406.

The interference alert 406 may include a variety of information. For example, the interference alert 406 may indicate a likelihood that the interference is real. A real interference may correspond to a physical connection between the object and the autonomous vehicle 350. In some cases, a real interference may correspond to a collision (e.g., within a testing/simulated environment). For example, if an object is classified as interfering with the autonomous vehicle 350 according to the criteria above, its interference probability may be estimated. If the estimated value is above a threshold interference value, which may correspond to a threshold probability (e.g., 0.3), then the evaluator 404 may determine that the predicted interference is real. This probability may be increased if a number of lidar points or non-trivial collision impulses is above a threshold number.

Additionally, or alternatively, the probability that an interference is real may increase proportionally with the confidence of the interference detection system 410 in the potential interferences. For example, the higher the quantity of sensor data points within the threshold distance of the track of the autonomous vehicle 350, the higher the confidence in the potential interference for a particular timeframe.

The interference alert 406 may indicate a classification of the object or an identifier associated with the track of the object. The classification of the object may indicate the object is a vehicle or other type of object.

The interference alert 406 may indicate a location of the interference within the environment 330 or a location of the interference with respect to (e.g., on) the autonomous vehicle 350. The location of the interference within the environment may be represented as a coordinate within a local map of the environment. Additionally, or alternatively, the location of the interference may be represented as radial coordinates relative to the autonomous vehicle 350 or indicate a place or portion of the autonomous vehicle 350 where the interference occurred.

The interference alert 406 may indicate a time of the interference, a relative speed of the object at the time of the interference, or a direction of travel of the object at the time of the interference. The time of the interference may be represented by the initial timeframe in which the potential interference was identified. Additionally, or alternatively, the time of the interference may be represented by the timeframes during the interference occurred (e.g., t1 to t3). The direction of travel of the object may be represented as relative to cardinal direction, relative to the autonomous vehicle, with respect to a map, or with respect to certain geographic markings/features (e.g., lane boundaries).

The interference alert 406 may indicate a degree of entanglement between the autonomous vehicle 350 and the object following the interference. The degree of entanglement may correspond to a degree that the object (e.g., test object) latched to the autonomous vehicle 350. The degree of entanglement may be increased when there have been consecutive determinations of interference across multiple frames or timeframes. In some embodiments, the evaluator 404 may determine a duration between a current time that an interference is detected and a last time associated with an interference (e.g., a consecutive or continuous interference). In some embodiments, the evaluator 404 may determine a length of time associated with a continuous interference. A continuous interference may correspond to an interference at the same location on the autonomous vehicle 350 that occurs over a computable length of time.

The interference detection system 410 may provide the interference alert 406 to a remote computing device or to one or more systems of the autonomous vehicle 350 (e.g., motion planning system 250). For example, the evaluator 404 may output the interference alert 406 over a network to the remote assistance system 270, which is remote from the autonomous vehicle 350. Additionally, or alternatively, the evaluator 404 may output the interference alert 406 to the motion planning system 250 onboard the autonomous vehicle 350.

The autonomous vehicle 350 may initiate a motion control action based on the interference alert 406. The motion control action may be performed by one or more of the autonomy systems 201 (e.g., the control system 260). The motion control action may include stopping the autonomous vehicle 350 in a current travel lane or stopping the autonomous vehicle 350 on a shoulder of a travel way. Additionally, or alternatively, the motion control action may include slowing down the autonomous vehicle 350, turning the autonomous vehicle 350, or causing the autonomous vehicle 350 to accelerate (e.g., to avoid prolonged interference, to avoid/reduce entanglement).

Figure 5:
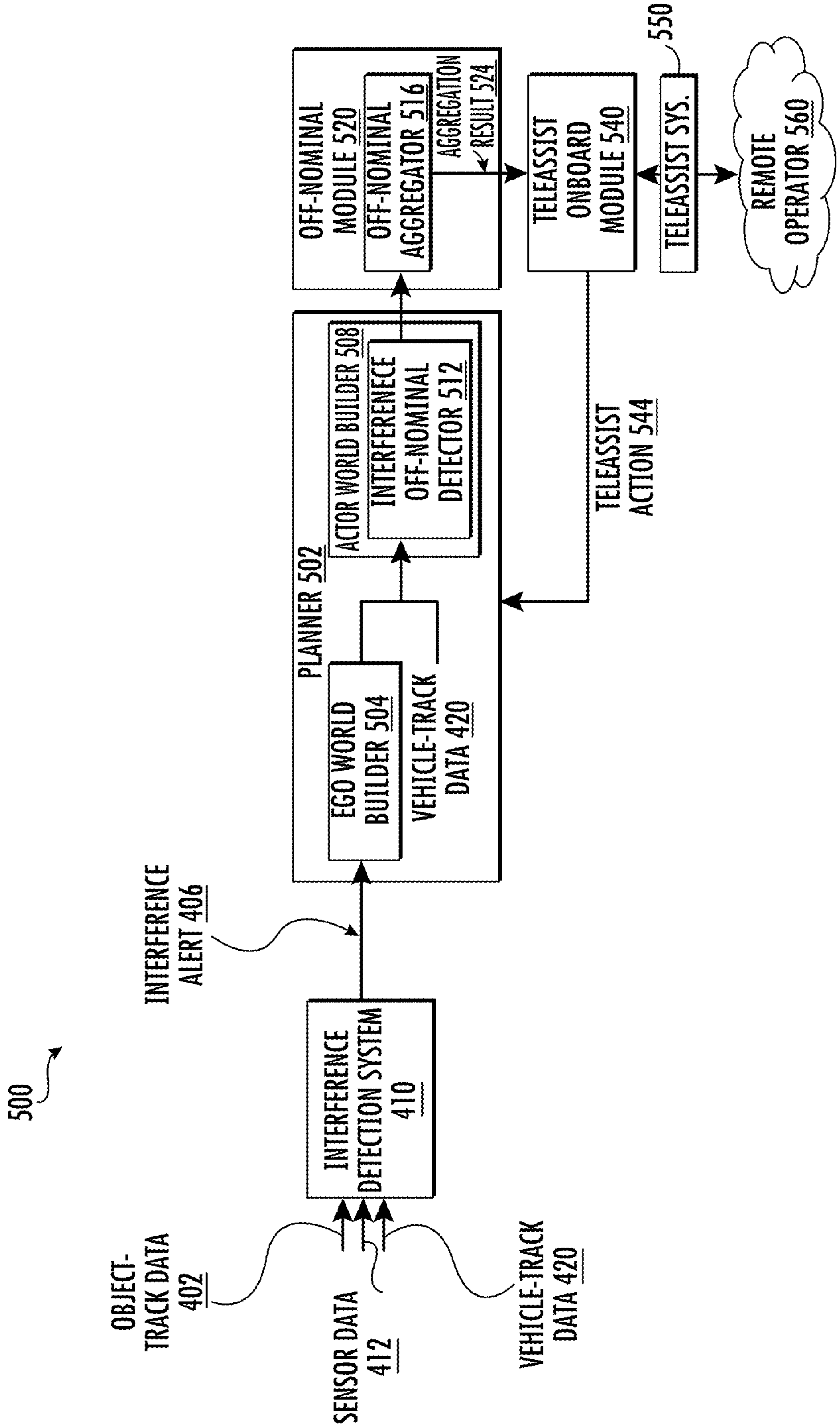
FIG. 5 depicts an example flow diagram, according to some embodiments.

With further reference to the figures, FIG. 5 depicts an example flow diagram 500, according to some embodiments. The flow diagram 500 can indicate a flow of data that may pass through one or more systems described herein, such as the interference detection system 410 or the evaluator 404. As shown, the object-track data 402, sensor data 412, or vehicle-track data 420 may be transmitted to the interference detection system 410. The interference detection system 410 may generate an interference alert 406.

The interference alert 406 may include data that may be used by a planner 502. The planner 502 may be a remote computing system or an onboard system of the autonomous vehicle 350. In some embodiments, the motion planning system 250 may include the planner 502.

The planner 502 may include an ego world builder 504 and an actor world builder 508. The ego may refer to the autonomous vehicle 350 or space within a threshold distance of the autonomous vehicle 350. The actor world builder 508 can include an interference off-nominal detector 512. The data obtained or generated by the ego world builder 504 may be combined with the vehicle-track data 420 and passed to the interference off-nominal detector 512 of the actor world builder 508. The term "actor" may be a generic descriptor of real objects (e.g., moving dynamic objects) in the environment 300 detected by the interference detection system 410. The actor world builder 508 may be structured to generate a representation, (e.g., three-dimensional (3D) representation) of interactions between the autonomous vehicle 350 and other objects in the environment 300.

The interference off-nominal detector 512 may be structured to determine a maneuver (e.g., a minimal risk maneuver). Additionally, or alternatively, the interference off-nominal detector 512 may be structured to notify a remote assist system. The interference off-nominal detector 512 may be structured to track detections of interferences that persist for longer than a threshold duration (e.g., about 5 seconds). In some embodiments, to save computation or memory resources, the interference off-nominal detector 512 may discard other data not associated with interferences that satisfy the threshold duration. This may allow the interference off-nominal detector 512 to perform more accurate or more rapid calculations that may be ultimately passed to a remote operator 560.

An off-nominal module 520 may be structured to receive data from the interference off-nominal detector 512 and aggregate the data using an off-nominal aggregator 516. The off-nominal aggregator 516 may store or categorize interferences determined by the interference detection system 410 or detected by the interference off-nominal detector 512. The off-nominal aggregator 516 may output an aggregation result 524 that can be transmitted to a teleassist onboard module 540, which may be onboard the autonomous vehicle 350.

The teleassist onboard module 540 may be structured to communicate with a teleassist system 550 located remotely from the autonomous vehicle 350. The teleassist onboard module 540 may transmit the aggregation result 524 to the teleassist system (not shown). The teleassist system 550 may be structured to display data indicative of an interference, as well as other operating conditions of the autonomous vehicle 350, to a remote operator 560. The remote operator may determine a teleassist action 544 for the autonomous vehicle 350 to perform based on the interference. This may include, for example, decelerating the autonomous vehicle 350 and pulling to a shoulder on a travel way.

The teleassist system 550 may provide, over a network, data indicative of the teleassist action 544 to the teleassist onboard module 540. The telassist onboard module 540 may process/translate the data for consumption by the planner 502 and provide the teleassist action 544 to the planner 502.

The planner 502 may generate a plan or command based on the teleassist action 544. The plan or command may be structured to modify the speed or heading of the autonomous vehicle 350. For example, as noted above, the command may include a trajectory that causes a control action to be performed by the autonomous vehicle 350 (e.g., via the control system 260).

Figure 6:
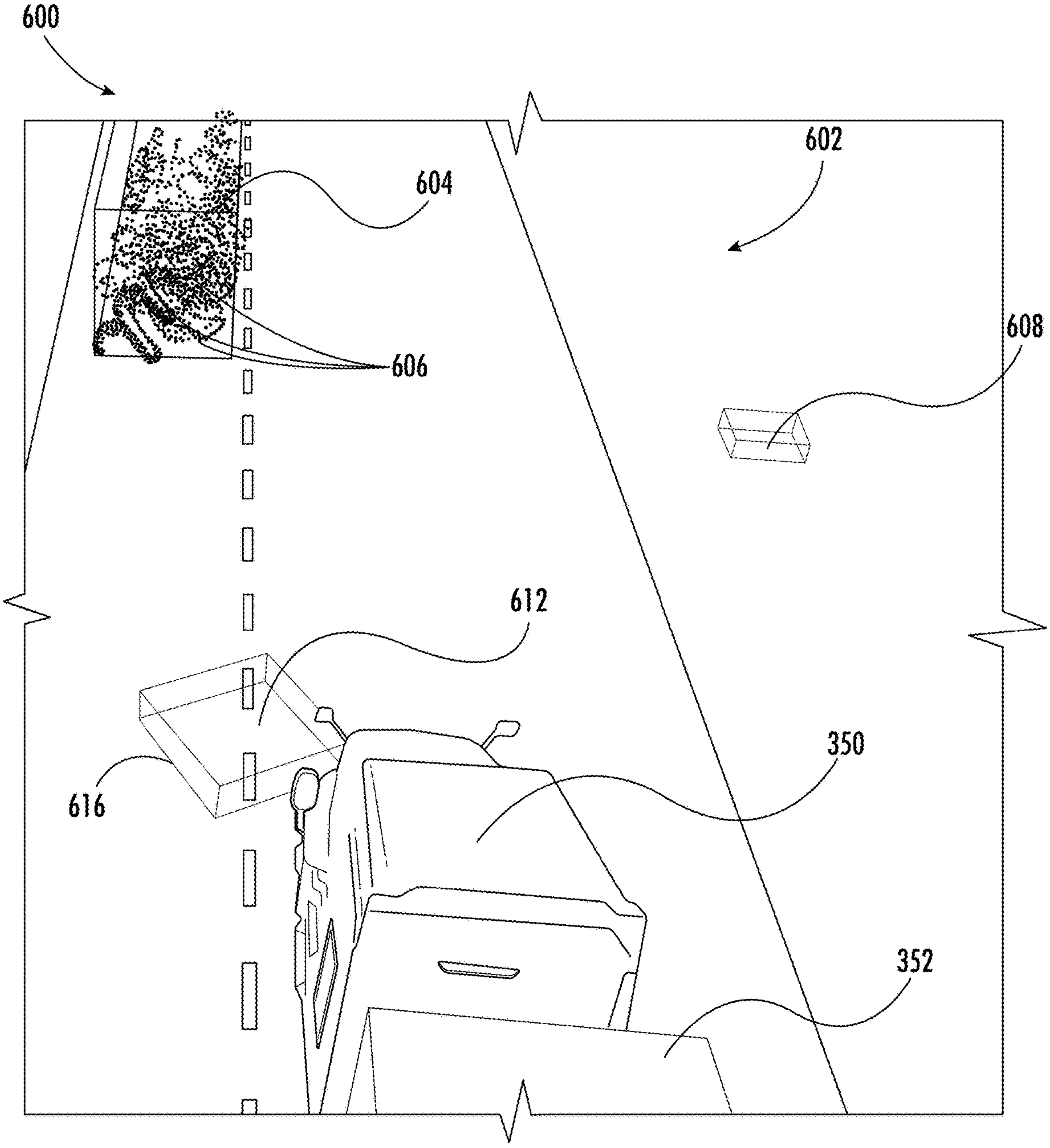
FIG. 6 shows an example diagram that includes an autonomous vehicle with an autonomous vehicle trailer, and various tracks.

FIG. 6 shows an example diagram 600 that includes an autonomous vehicle 350 with a vehicle trailer 352, and various object tracks 604, 608, 612 of objects within an environment 602 of the autonomous vehicle 350. The sensors 202 of the autonomous vehicle 350 may obtain a plurality of sensor data points 606. The interference detection system 410 may determine that the sensor data points 606 correspond to an object track 604. Additionally, or alternatively, the sensors 202 may obtain one or more sensor data points corresponding to an object track 608 or an object track 612.

The interference detection system 410 may determine that the object track 612 has an object bounding shape 616. As shown, the object bounding shape 616 may correspond to a rectangular prism. Other shapes are possible (e.g., ovoids, triangular prisms, etc.).

The interference detection system 410 may determine that object track 612 may cause a potential interference with the autonomous vehicle 350. For example, the interference detection system 410 may determine that a threshold number of sensor data points associated with the object track 612 (and/or with the object bounding shape 616) may be within a threshold distance of the autonomous vehicle 350 (or a track thereof) and that the object track 612 and the autonomous vehicle 350 have a relative velocity indicating the two are getting closer to one another. As noted, one or more systems of the autonomous vehicle 350 may cause the autonomous vehicle 350 to modify a trajectory of the autonomous vehicle 350 based on a determination that the object track 612 has, is, or soon will be, interfering with the autonomous vehicle 350. Additionally, or alternatively, the interference detection system 410 may determine a location on the autonomous vehicle 350 associated with the interference (e.g., front bumper).

Figure 7:
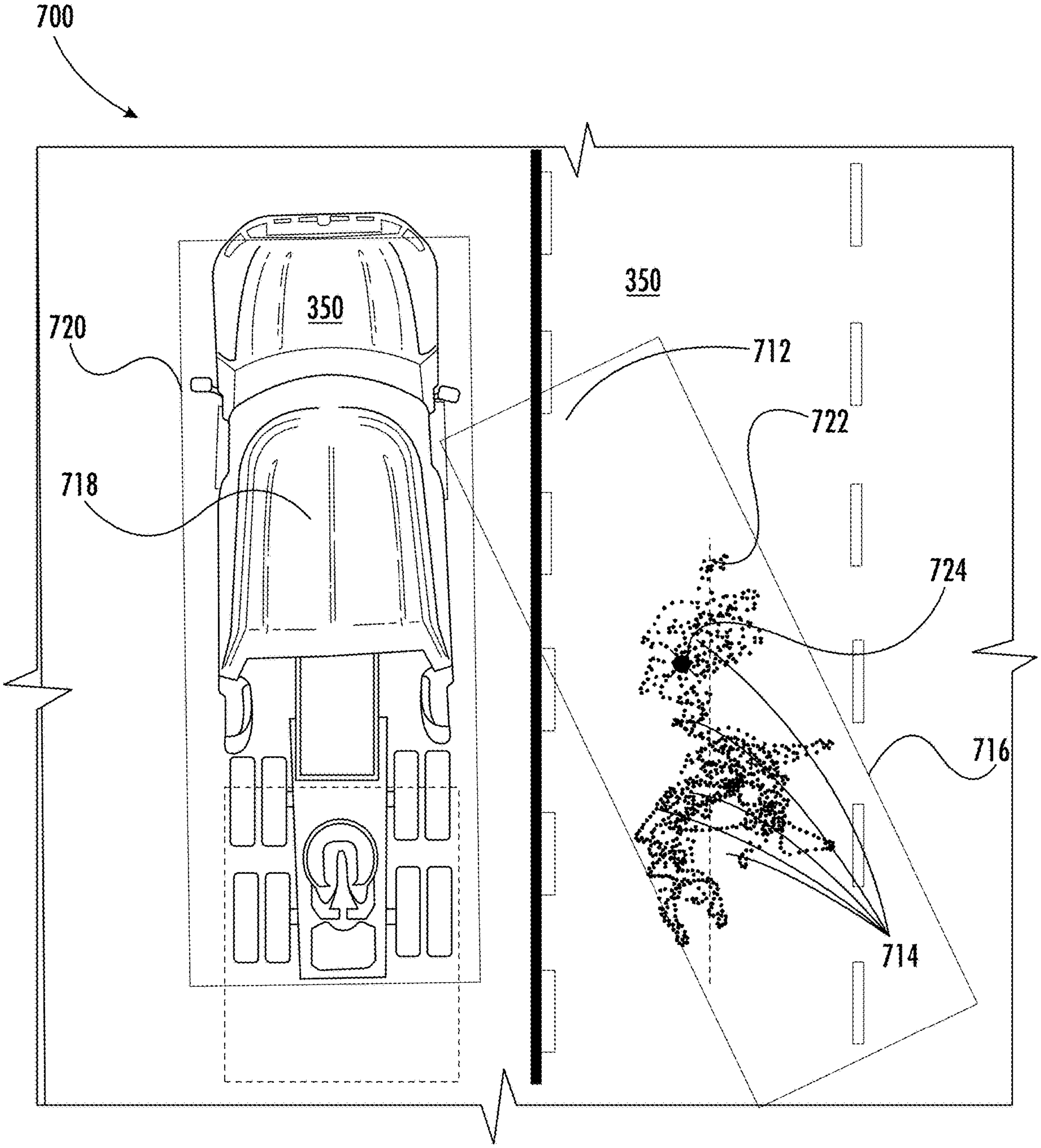
FIG. 7 shows another example diagram, according to some embodiments.

FIG. 7 shows another example diagram 700, according to some embodiments. As shown, object track 712 of an object is interfering with the track 718 of the autonomous vehicle 350. The diagram 700 may indicate the object track 712 (and autonomous vehicle track 718) at a first timeframe. The autonomous vehicle 350 may utilize the functionality of the interference detection system 410 to determine that such an interference exists between the object and the autonomous vehicle 350.

For example, the autonomous vehicle 350 may determine the track of the autonomous vehicle 350 that includes a bounding shape 720 of the autonomous vehicle 350. The bounding shape 720 may correspond to the size and shape of the autonomous vehicle 350. The autonomous vehicle 350 can determine the object track 712 of the object. The object track may include object bounding shape 716.

The autonomous vehicle 350 may obtain one or more sensor data points 714 associated with the object track 712. The sensor data points 714 may include LIDAR points across a plurality of timeframes corresponding to the acquisition of the sensor data points 714. The object track 712 may include the sensor data points 714 indicating the current location and one or more past locations of the corresponding object with the environment shown in FIG. 7. In some embodiments, the autonomous vehicle 350 may determine the object bounding shape 716 based on the sensor data points 714.

The autonomous vehicle 350 may determine whether the object is interfering with the autonomous vehicle 350 based on one or more factors. For example, the autonomous vehicle 350 may determine that at least a portion of the object track 712 overlaps with the track 718 of the autonomous vehicle 350. In some embodiments, the autonomous vehicle 350 may be structured to determine the portion of the object track 712 that overlaps with the bounding shape 720 even if none or an insufficient number of sensor data points 714 are obtained corresponding directly to that portion, as shown in FIG. 7. As described herein, this can be performed by comparing coordinates representing the borders of the respective bounding shapes. Additionally, or alternatively, the autonomous vehicle 350 may determine that a threshold quantity of the sensor data points 714 is at least partially within a threshold distance 722 of the track 718 of the autonomous vehicle 350.

The autonomous vehicle 350 may also determine a closing velocity of the sensor data points 714. As described herein, the closing velocity can include a closing velocity of a centroid 724 of the sensor data points 714. The closing velocity can satisfy a closing velocity threshold, indicating the object (e.g., the object track 712, bounding shape 716) is moving toward the autonomous vehicle 350.

Based on these determinations, the autonomous vehicle 350 may determine that a potential interference occurred/is occurring at the first timeframe associated with FIG. 7. In some embodiments, as described herein, the autonomous vehicle 350 may provide an indication of the potential interference between the target track 712 and the autonomous vehicle 350 at the first time. The autonomous vehicle 350 can continue to iteratively perform similar computations over subsequent timeframes. Based on the determinations across the plurality of timeframes, the autonomous vehicle 350 may determine that an actual interference has occurred between the autonomous vehicle 350 and the object.

Figure 8A:
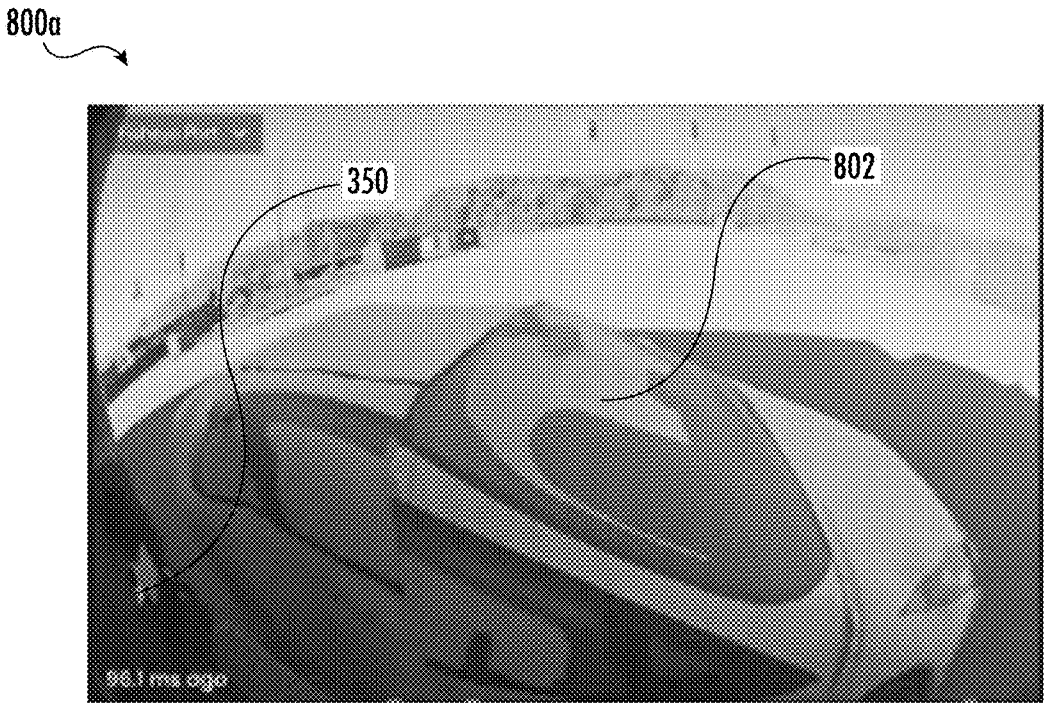
FIG. 8A shows an example diagram of a target object in the vicinity of an example autonomous vehicle, according to some embodiments.

FIG. 8A shows an example diagram 800*a* of an object 802 in the vicinity of the autonomous vehicle 350, according to some embodiments. The autonomous vehicle 350 may capture imagery of the target object 802 using one or more sensors 202 (e.g., an imaging sensor). The object 802 may be shown as an image. In some embodiments, one or more systems herein may correlate imagery data with data from LIDAR sweeps to improve accuracy or resolution of a location of the object 802, a bounding box of the object 802, or the reality or ephemerality of one or more data points corresponding to perception data 245 or sensor data 204. As shown, the object 802 may not be physically contacting the autonomous vehicle 350, at least in the timeframe shown in FIG. 8A.

Ephemeral data points may be associated with noise, reflections, or other non-object-related phenomena that the autonomous vehicle 350 may detect but which do not represent an actual object on which the autonomous vehicle 350 (e.g., interference detection system 410) should dedicate resources for interference analysis. Real data points may be associated with actual objects, to which the autonomous vehicle 350 should dedicate resources for interference analysis.

The reality or ephemerality of a data point can be determined based on a variety of factors. In an example, the autonomous vehicle 350 may determine that a data point is an ephemeral data point based on the data point failing to correlate spatially with data from other sensors 202 (e.g., from a camera or radar) or failing to correspond with expected objects (e.g., vehicles, pedestrians, and/or static infrastructure). The autonomous vehicle 350 may determine that a data point is a real data point based on the data point correlating spatially with data from other sensors 202 or corresponding with expected objects. Additionally, or alternatively, data points determined to be at a height that is less than a height threshold (e.g., 5, 7, 10 . . . cm) above the ground level may be considered ephemeral data points, while data points that satisfy (e.g., at or above) the height threshold may be considered real data points. Additionally, or alternatively, data points associated with certain environmental conditions (e.g., rain, fog, snow, puddles, other reflective surfaces) may be considered ephemeral.

Figure 8B:
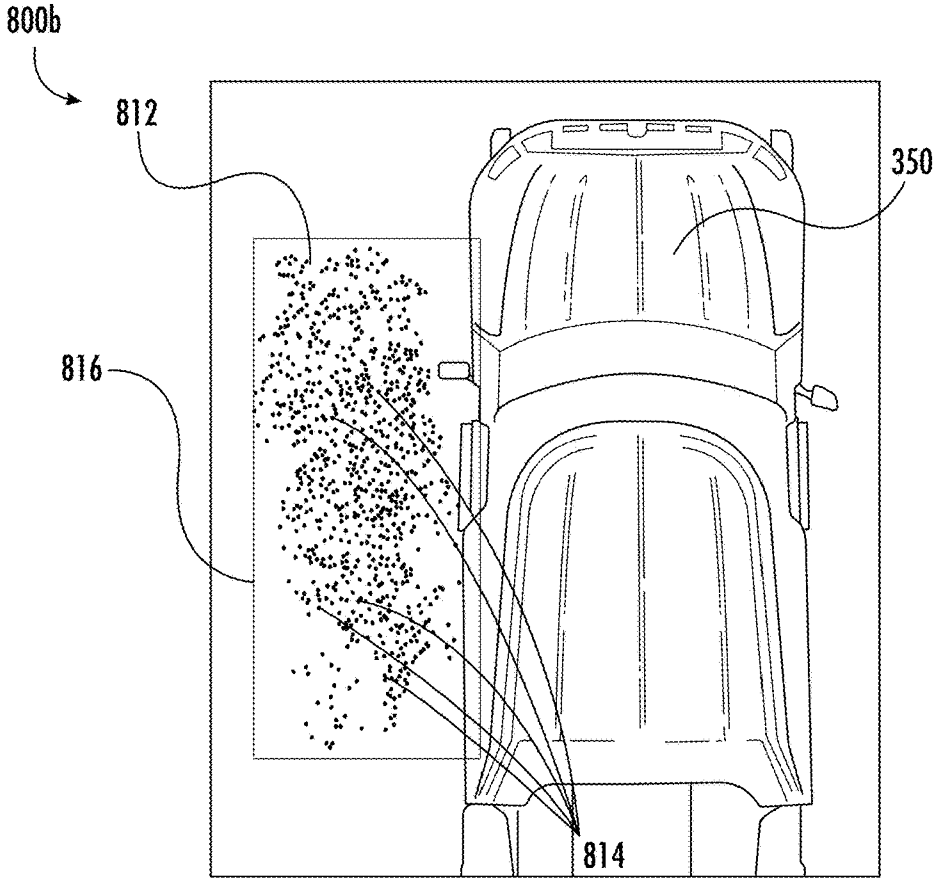
FIG. 8B shows another example diagram of an autonomous vehicle, according to some embodiments.

FIG. 8B shows another example diagram 800*b* of the autonomous vehicle 350, according to some embodiments. As shown, the autonomous vehicle 350 may obtain a plurality of sensor data points 814 associated with object 802 of FIG. 8A. An object track 812 of object 802 may include the sensor data points 814. Based on the sensor data points 814, the autonomous vehicle 350 may determine a bounding shape 816 of the object track 812. The object track 812 may be interfering with the autonomous vehicle 350 (e.g., a bounding box associated with the autonomous vehicle 350) because the object track 812 overlaps with the track of the autonomous vehicle 350, a threshold quantity of sensor data points 814 are at least partially within a threshold distance of the track of the autonomous vehicle 350, and sensor data points 814 have a threshold closing velocity.

In some embodiments, the autonomous vehicle 350 may determine the occurrence of a potential interference based on other types of data. For example, the autonomous vehicle 350 may obtain inertial measurement data associated with the autonomous vehicle 350. The inertial measurement data may indicate a lateral acceleration or other inertial measures of the autonomous vehicle 350, in the first timeframe. A lateral acceleration may be indicative of the object 802 getting close to or colliding with the autonomous vehicle 350 (e.g., in test environment). The object track 812 or the track of the autonomous vehicle 350 may include the inertial measurement data. The autonomous vehicle 350 may determine the occurrence of the potential interference (e.g., at the first timeframe) based on the inertial measurement data.

Additionally, or alternatively, the autonomous vehicle 350 may obtain audio data associated with the autonomous vehicle 350. The audio data may be acquired via a microphone onboard the autonomous vehicle 350. The audio data may indicate a sound or noise from the external environment of the autonomous vehicle 350. The sound or noise may indicate a physical contact of the autonomous vehicle 350 and the object 802, or lack thereof, in a particular timeframe. The object track 812 or the track of the autonomous vehicle 350 may include the audio data. The autonomous vehicle 350 may determine the occurrence of the potential interference based on the audio data.

By way of example, the audio data may be indicative of a sound of a metal surface contacting another metal surface. The autonomous vehicle 350 may process the audio data to determine that the sound may be indicative of an object contacting the autonomous vehicle 350. For instance, the interference detection system 410 may include a model/algorithm that is configured to process the audio data to determine that the sound is associated with a potential interference. During its track analysis, as described herein, the interference detection system 410 may weigh the audio data as further supporting evidence to help determine that a potential interference (or an actual interference) occurred between the autonomous vehicle 350 and an object.

Figure 9:
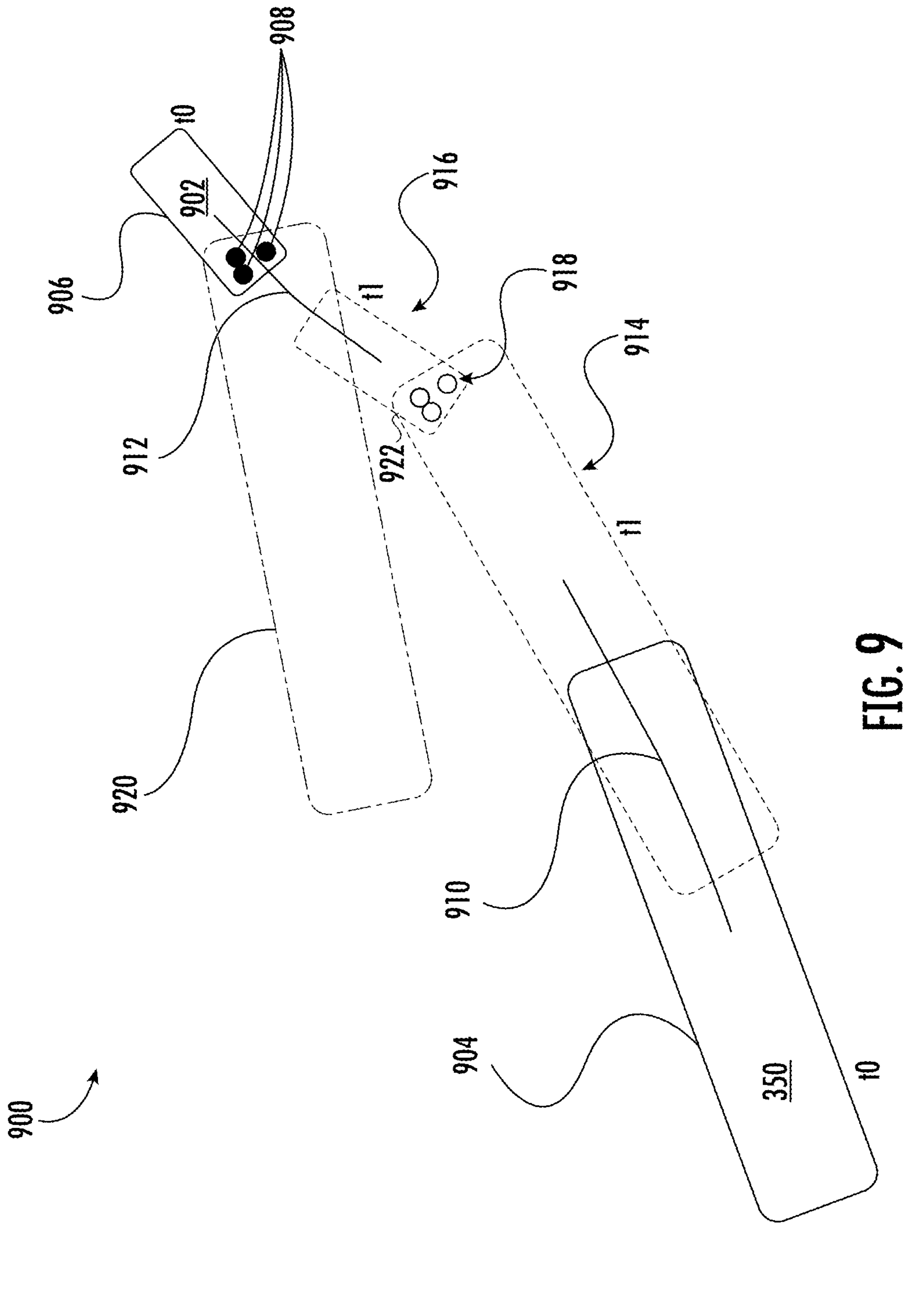
FIG. 9 shows an example diagram of a projected autonomous vehicle trajectory and a projected target track trajectory, according to some embodiments.

FIG. 9 shows an example diagram 900 of an overhead view of an environment of an autonomous vehicle 350. FIG. 9 illustrates an additional, or alternative, technique for predicting an interference between an object 902 and an autonomous vehicle 350. The described process may be particularly suitable for predicting interference, within timeframes beneath the precision of a sensor hardware of the autonomous vehicle 350. For example, the process described with reference to FIG. 9 may allow an autonomous vehicle 350 to predict the occurrence of an interference where the LIDAR data points associated with the object are sparse during a first timeframe (e.g., t0) and potentially nonexistence to the next timeframe (e.g., t1=t0+0.1 s). The first and second timeframes may be associated with the sweeps of the corresponding LIDAR sensor and the object may move to a position (e.g., close to or contacting the autonomous vehicle 350) that does not have LIDAR returns.

FIG. 9 depicts a bounding shape 904 of a track of the autonomous vehicle 350 and a bounding shape 906 of the track of the object 902. The position of bounding shape 904 and bounding shape 906 shown in FIG. 9 may represent the position of the bounding shape 904 and the bounding shape 906 at a first timeframe (t0). At the first timeframe, the track of the object 902 may include one or more first sensor data points 908. The first sensor data points 908 may include a sparse or limited number of LIDAR data points (e.g., 1, 2, 3, 4) that reflected off the object 902 and returned to the LIDAR sensor during a first LIDAR sweep. During subsequent sweeps, the autonomous vehicle 350 may not obtain any LIDAR data points associated with the object 902.

To help determine whether the track of the object 902 is projected to potentially interfere, or potentially interfered, with the track of the autonomous vehicle 350 after the first timeframe, the autonomous vehicle 350 (e.g., the interference detection system 410) may be structured to project the position (e.g., including location, orientation, speed, and heading) of the track of the object 902 and the position of the track of the autonomous vehicle 350 into the second timeframe (t1). The difference (t−delta) between the first timeframe (t0) and the second timeframe (t1) may correspond to the frequency of sensor data acquisitions. For example, the difference (t−delta) may be equivalent to the time between LIDAR sweeps (e.g., 0.1 s intervals).

The projected positions at the second timeframe may be based on a projected AV trajectory 910 and a projected object trajectory 912. The interference detection system 410 can determine an updated track of the autonomous vehicle 350 based on the projected AV trajectory 910. For example, given the projected AV trajectory 910 (e.g., as determined by the motion planning system 250), the interference detection system 410 may utilize a ballistic model to determine a projected position 914 (e.g., location and orientation) of the bounding shape 904 of the autonomous vehicle 350 at a second, future timeframe (t1).

The interference detection system 410 can determine an updated track of the object 902 based on the projected object trajectory 912. For example, given the projected object trajectory 912 (e.g., as determined by a forecasting function), the interference detection system 410 may utilize a ballistic model to determine a projected position 916 (e.g., location and orientation) of bounding shape 906 of the object 902 at the second, future timeframe (t1).

The projected track of the object 902 may include projected sensor data points 918. The interference detection system 410 may generate the projected sensor data points 918 based on the projected position 916 of the bounding shape 906 of the object 902. For instance, the interference detection system 410 may determine the original position and orientation of the sensor data points 908 relative to the original position and orientation of the bounding shape 906 of the object 902, at the first timeframe (t0). Based on the projected position 916 of the bounding shape 906, the interference detection system 410 can transform the sensor data points 418 to be positioned and oriented relative to the object bounding shape 906 at the projected position 916 such that the projected sensor data points 918 are positioned similarly as the original position of the sensor data points 418 relative to the original position of the object bounding shape 906.

The interference detection system 410 may identify the overlap between the bounding shape 904 of the autonomous vehicle 350 at the projected position 914 and the bounding shape 906 of the object 902 at the projected position 916, in the second timeframe (t1). The projected sensor data points 918 may be positioned within the interior region of the bounding shape 904 of the autonomous vehicle 350 (and the bounding shape 906 of the object 902), at the second timeframe. The overlap between the bounding shapes 904, 906 at the second timeframe (t1) can indicate the position of the bounding shape 904 relative to the projected sensor data points 918, at the second timeframe (t1). The overlap can indicate or predict a potential interference between the track of the object 902 and the track of the autonomous vehicle 350, at the second timeframe (t1).

The interference detection system 410 may generate a phantom autonomous vehicle 920 based on the projected position 914 of the bounding shape 904 relative to the projected sensor data points 918, at the second timeframe (t1). The phantom autonomous vehicle 920 may be represented by a bounding shape with the same (or similar) dimensions and shape as the bounding shape 904 of the autonomous vehicle 350. The phantom autonomous vehicle 920 may be generated relative to the first timeframe (t0) based on the overlap of the bounding shape 904 of the autonomous vehicle 350 and the bounding shape 906 of the object 902 in the respective projected positions 914 and 916, at the second timeframe (t1).

For example, interference detection system 410 may generate the phantom autonomous vehicle 920 such that the phantom autonomous vehicle 920 is positioned relative to the bounding shape 906 and the sensor data points 908 (at the first timeframe), in the same manner that the bounding shape 904 of the autonomous vehicle 350 is positioned relative to the bounding shape 906 of the object 902 and the projected sensor data points 918 (at the second timeframe). To do so, the interference detection system 410 may identify characteristics (e.g., size, shape, orientation) of the overlap 922 created by the bounding shape 904 and the bounding shape 906 at the respective projected positions 914 and 916. The characteristics may be defined within a reference frame. For example, the size and shape of the overlap 922 may be represented by a series of coordinates (e.g., in a 2-D coordinate frame) that outline the shape of the overlap 922. The orientation of the overlap 922 may be defined by one or more angles within the reference frame. The interference detection system 410 can interpolate the position of the phantom autonomous vehicle 920 by transposing the overlap 922 onto the position of the bounding shape 906 at t0. The transposition may include shifting the series of coordinates of the overlap 922 to overlap with the bounding bound shape 906 at t0, with the same orientation as the overlap at t1. The interference detection system 410 may generate the remainder of the phantom autonomous vehicle shape, from the overlap 922, to match the dimensions of the bounding shape 904 of the vehicle, as shown in FIG. 9.

The position of the phantom autonomous vehicle 920 (and the overlap with the bounding shape 906 of the object 902) may help determine the occurrence of a potential interference between the track of the object 902 and the track of the autonomous vehicle 350 based on a projection/inference from a future, second timeframe. In this way, the autonomous vehicle 350 may leverage the unique computations performed by the autonomy systems 201 of the autonomous vehicle 350 to address a technical problem introduced by its sensor hardware (e.g., data sparsity due to LIDAR frequency constraints).

Figure 10A:
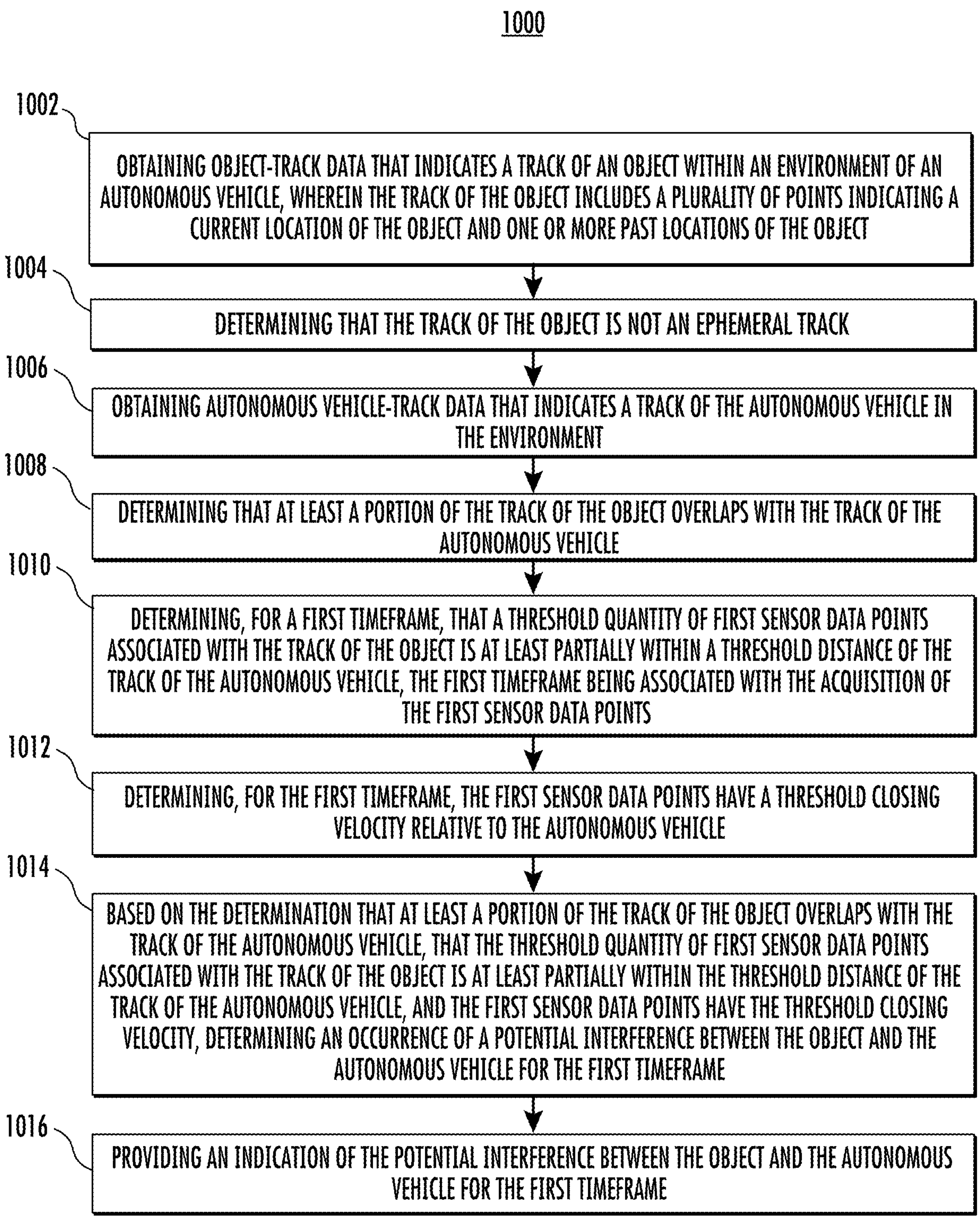
FIGS. 10A-C are flowcharts of example methods for determining an interference between an object and an autonomous vehicle according to aspects of the present disclosure.
Figure 10B:
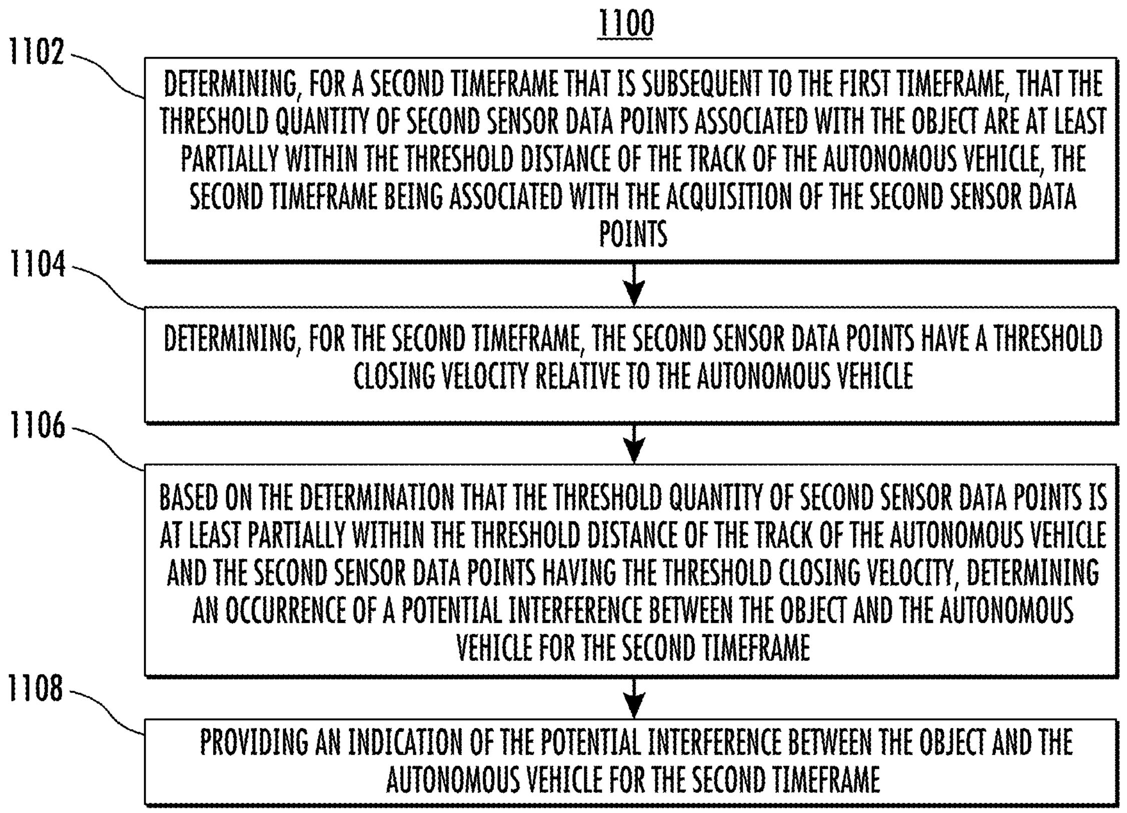
Figure 10C:
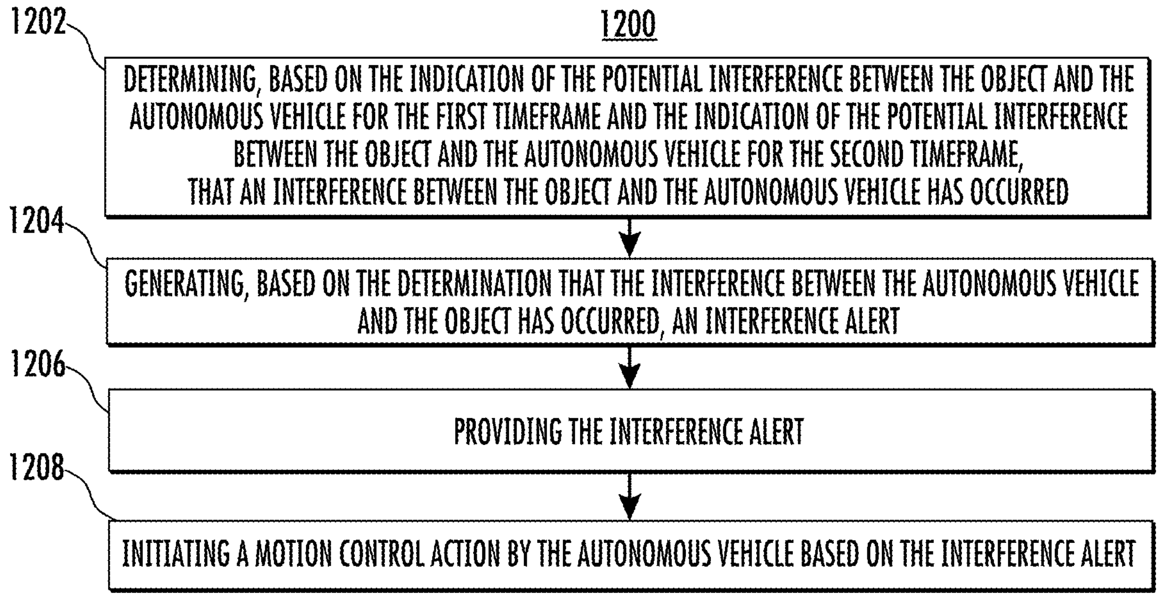

FIGS. 10A-C are flowcharts of example methods 1000, 1100, and 1200 according to aspects of the present disclosure. One or more portions of the example methods can be implemented by the computing systems described with reference to the other figures (e.g., autonomous platform 110, onboard computing system 180, remote system 160, the interference detection system 410, the evaluator 404, a system of FIGS. 1 to 9, 11, etc.). Each respective portion of the example methods can be performed by any (or any combination) of one or more computing devices. Moreover, one or more portions of the example methods can be implemented on the hardware components of the devices described herein (e.g., as in FIGS. 1 to 9, 11, etc.).

FIGS. 10A-C depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure.

FIGS. 10A-C are described with reference to elements/terms described with respect to other systems and figures for exemplary illustrated purposes and is not meant to be limiting. One or more portions of the example methods can be performed additionally, or alternatively, by other systems.

FIG. 10A is a flowchart of an example method 1000 for determining a potential interference (e.g., in a first timeframe) between an object and an autonomous vehicle 350 according to aspects of the present disclosure.

At 1002, example method 1000 may include obtaining object-track data 402 that indicates a track 712 of an object within an environment of an autonomous vehicle 350. The track 712 of the object may include a plurality of points indicating a current location of the object and one or more past locations of the object. For example, the example method 1000 may include obtaining sensor data 204 indicative of the object within the environment of the autonomous vehicle 350. The sensor data may include sensor data points 714. The sensor data 204 may be associated with a first timeframe, and the sensor data 204 may include first sensor data points. For example, as described herein, the sensor data 204 can include LIDAR data. The first timeframe can be associated with a first LIDAR sweep of a LIDAR system of the autonomous vehicle 350.

At 1004, example method 1000 may include determining that the track 712 of the object is not an ephemeral track. As described herein, this may include determining that the first sensor data points (of a centroid thereof) satisfy a height threshold (e.g., 5 cm) above the ground. For example, the interference detection system 410 may determine that the track 712 of the object is associated with a real or persistent object, in the event the height threshold is satisfied.

At 1006, example method 1000 may include obtaining autonomous vehicle-track data 420 that indicates a track 718 of the autonomous vehicle 350 in the environment. As described herein, the track 718 of the autonomous vehicle 350 can be indicative of a current and one or more past locations of the autonomous vehicle 350, vehicle speed, heading, the bounding shape 720 of the autonomous vehicle 350, or other parameters.

At 1008, example method 1000 may include determining that at least a portion of the track of the object 712 overlaps with the track of the autonomous vehicle 350. For example, to do so, the method 1000 may include determining that at least a portion of the object bounding shape 716 at least partially intersects with (or includes sensor data points 714 that intersect with) the bounding shape 720 of the autonomous vehicle. In some embodiments, this can be performed by comparing coordinates representing the borders of the respective bounding shapes.

At 1010, example method 1000 may include determining, for a first timeframe, that a threshold quantity of first sensor data points associated with the track 712 of the object are at least partially within a threshold distance 722 of the track of the autonomous vehicle 350. For example, as described herein, the first timeframe may be associated with the acquisition of the first sensor data points and the threshold distance 722 may include a buffer distance from an exterior surface of the autonomous vehicle 350.

The example method 1000 may include determining, for the first timeframe, that a number of first sensor data points associated with the track 712 of the object that are at least partially within the threshold distance 722 of the track of the autonomous vehicle 350 satisfies the threshold quantity. A sensor data point 714 may be considered to be at least partially within the threshold distance 722 in the event at least a portion of that data point is at or within the threshold distance 722. In an example, the threshold quantity may be satisfied if at least N LIDAR points are within the threshold distance 722 (e.g., 0.2 m, 0.3 m, 0.4 m) to the bounding shape 720 of the autonomous vehicle 350. In some implementations, a LIDAR point may be counted towards meeting the threshold so long as at least a portion of that data point is at or within the threshold distance 722. In some implementations, a LIDAR point may be counted towards meeting the threshold so long as the entirety of that data point is within the threshold distance 722.

At 1012, example method 1000 may include determining, for the first timeframe, the first sensor data points have a threshold closing velocity relative to the autonomous vehicle 350. For example, the example method 1000 may include determining a first closing velocity based on the sensor data 204. The example method 1000 may include determining that the first closing velocity satisfies the threshold closing velocity. As described herein, that can include determining a first closing velocity of the object based on a centroid 724 of the first sensor data points associated with the object.

At 1014, example method 1000 may include, based on the determination that at least a portion of the track of the object overlaps with the track of the autonomous vehicle, that the threshold quantity of first sensor data points associated with the track of the object is at least partially within the threshold distance of the track of the autonomous vehicle, and the first sensor data points have the threshold closing velocity, determining an occurrence of a potential interference between the object and the autonomous vehicle 350 for the first timeframe. By meeting these criteria, the autonomous vehicle 350 may determine that within the relevant environment (e.g., testing, simulated, real-world) the object is potentially close to or even physically contacting the autonomous vehicle 350, at the first timeframe. This improves the detection responsiveness and granularity of the autonomous vehicle 250 during vehicle operation, beyond the level achievable by manual processes. For example, by utilizing the described approach, the autonomous vehicle is able to determine potential interferences within close range clearances (e.g., within millimeters). The autonomous vehicle 350 may also detect where an interference specifically occurred on the autonomous vehicle 350 (e.g., a location-specific interference to the vehicle's bumper). Accordingly, the autonomous vehicle 350 can more quickly/accurately diagnose, and control its motion in response to, the occurrence of a potential interference.

At 1016, example method 1000 can include providing an indication of the potential interference between the object and the autonomous vehicle 350 for the first timeframe. For example, the evaluator 404 of the interference detection system 410 may adjust a data structure stored onboard the autonomous vehicle 350 to indicate the occurrence of the potential interference, for the first timeframe.

The autonomous vehicle 350 may continue to iteratively process the track 712 of the object to determine whether the potential interference persists across multiple timeframes. Through the iterative process, the autonomous vehicle 350 is able to leverage evidence from multiple timeframes to determine whether an actual interference has occurred. For example, each of the respective timeframes may be associated with an instance of sensor data collection. A respective instance of sensor data collection may include a sweep of a rotating LIDAR system, as described herein. By iteratively analyzing evidence across multiple LIDAR sweeps (or other sensor timeframes), the process described herein increases the computational confidence of the autonomous vehicle 350 that an interference has indeed occurred. This improves the overall detection ability of the autonomous vehicle 350, as well as its motion control response to an interference.

FIG. 10B is a flowchart of an example method 1100 for determining a potential interference (e.g., in a second timeframe) between the object and the autonomous vehicle 350 according to aspects of the present disclosure.

At 1102, example method 1100 may include determining, for a second timeframe that is subsequent to the first timeframe, that a threshold quantity of second sensor data points associated with the object are at least partially within the threshold distance 722 of the track 718 of the autonomous vehicle 350. The second timeframe may be associated with the acquisition of the second sensor data points. For example, the second sensor data points may include LIDAR point cloud data and the second timeframe may be the time of a second LIDAR sweep that returns the LIDAR point cloud data. As described herein, a second sensor data point may be considered at least partially within the threshold distance of the track 718 of the autonomous vehicle 350 in the event at least a portion of that data point is at or within the threshold distance 722.

At 1104, example method 1100 may include determining, for the second timeframe, the second sensor data points have a threshold closing velocity relative to the autonomous vehicle 350. For instance, the example method 1100 may include determining a centroid of the second sensor data points and determining a closing velocity of the centroid. The closing velocity of the centroid may, for example, be based on the average, medium, or a distribution of velocities of the individual second sensor data points. To determine whether the second sensor data points have a threshold closing velocity, the example method 1100 can include comparing the closing velocity of the centroid to the threshold closing velocity. In the event the closing velocity of the centroid satisfies the threshold closing velocity, the second sensor data points may be considered to have the threshold closing velocity relative to the autonomous vehicle 350.

At 1106, example method 1100 may include based on the determination that the threshold quantity of second sensor data points is at least partially within the threshold distance 722 of the track 712 of the autonomous vehicle 350 and the second sensor data points having the threshold closing velocity, determining an occurrence of a potential interference between the object and the autonomous vehicle 350 for the second timeframe.

At 1108, example method 1100 may include providing an indication of the potential interference between the object and the autonomous vehicle 350 for the second timeframe. As described herein, this may include the evaluator 404 of the interference detection system 410 adjusting a data structure stored onboard the autonomous vehicle 350 to indicate the occurrence of the potential interference for the second timeframe.

The autonomous vehicle 350 may aggregate the potential interference indications to determine whether an interference has indeed occurred and adjust the operation of the autonomous vehicle 350 accordingly.

FIG. 10C is a flowchart of an example method 1200 for determining the occurrence of the interference and, in response, controlling autonomous vehicle motion, according to aspects of the present disclosure.

At 1202, example method 1200 may include determining, based on the indication of the potential interference between the object and the autonomous vehicle 350 for the first timeframe and the indication of the potential interference between the object and the autonomous vehicle 350 for the second timeframe, that an interference between the object and the autonomous vehicle 350 has occurred. For example, the interference detection system 410 may compare the quantity of potential interference indications (from the multiple timeframes/timesteps) to an interference threshold. The interference threshold may indicate the threshold quantity of potential inference indications (e.g., 2, 3, 4, 5) that are to be satisfied for the interference detection system 410 to determine that an interference has occurred. For example, the interference detection system 410 may identify a series of seven potential interferences over a period of 10 seconds. This number of potential interferences over such a time frame can indicate to the interference detection system 410 that an interference has occurred.

In another example, the interference detection system 410 may determine that an interference between the object and the autonomous vehicle 350 has occurred within a shorter time frame. For example, the interference detection system 410 may analyze potential interference indications across a plurality of time frames that are separated by less than a second. The time frames may be 0.1 s, 0.2 s, 0.3 s, 0.4 s, 0.5 s, 0.6 s, and 0.7 s. Thus, within a short period of time (e.g., less than 1 s), the autonomous vehicle 350 is able to analyze the potential interference indications at each of these time frames to quickly determine that an interference between the object and the autonomous vehicle 350 has occurred. Accordingly, the autonomous vehicle 350 is able to more efficiently and effectively detect and diagnose interferences, and quickly react to autonomously control the motion of the autonomous vehicle 350 in response thereto. The improved ability of the autonomous vehicle 350 to quickly react further reduces the potential impact of an interference, including reducing potential damage to the mechanical structure/systems of the autonomous vehicle (or the object).

At 1204, example method 1200 may include generating, based on the determination that the interference between the autonomous vehicle 350 and the object has occurred, an interference alert 406. As described herein, the interference alert 406 may include at least one of: (1) a likelihood that the interference is real, (2) a classification of the object, (3) an identifier associated with the track, (4) a location of the interference within the environment, (5) a location of the interference on the autonomous vehicle, (6) a time of the interference, (7) a relative speed of the object at the time of the interference, (8) a direction of travel of the object at the time of the interference, or (9) degree of entanglement between the autonomous vehicle and the object following the interference.

At 1206, example method 1200 may include providing the interference alert. For example, the example method 1200 may include outputting, over a network, the interference alert 406 to a system that is remote from the autonomous vehicle 350. As described herein, the autonomous vehicle 350 may transmit the interference alert 406 over a wireless network to a remote teleassist system 550. A remote operator 560 may review the interference alert 406 and initiate an adjustment of the motion of the autonomous vehicle 350.

Additionally, or alternatively, the example method 1200 may include outputting the interference alert 406 to a system onboard the autonomous vehicle 350. For instance, the interference detection system 410 may output the interference alert 406 a motion planning system 250 of the autonomous vehicle 350.

At 1208, the example method 1220 may include initiating a motion control action by the autonomous vehicle 350 based on the interference alert 406. For instance, the autonomous vehicle 350 may obtain data indicative of a teleassist action 544 from a remote system. The teleassist action 544 may include data indicating certain maneuvers to be performed by the autonomous vehicle 350 or a trajectory for the autonomous vehicle 350. The autonomous vehicle 350 may generate a motion control action based on the teleassist action 544.

Additionally, or alternatively, the motion planning system 260 of the autonomous vehicle 350 may generate a motion plan based on the interference alert 406. The motion plan may include a trajectory for the autonomous vehicle 350. The trajectory may adjust the motion of the autonomous vehicle 350 based on the occurrence of the interference. For example, the motion control action may include at least one of stopping the autonomous vehicle in a current travel lane or stopping the autonomous vehicle on a shoulder of a travel way. The autonomous vehicle 350 may implement the motion control action by providing one or more signals to the platform control devices 212 to control the steering, acceleration, or velocity/speed of the autonomous vehicle 350.

Figure 11:
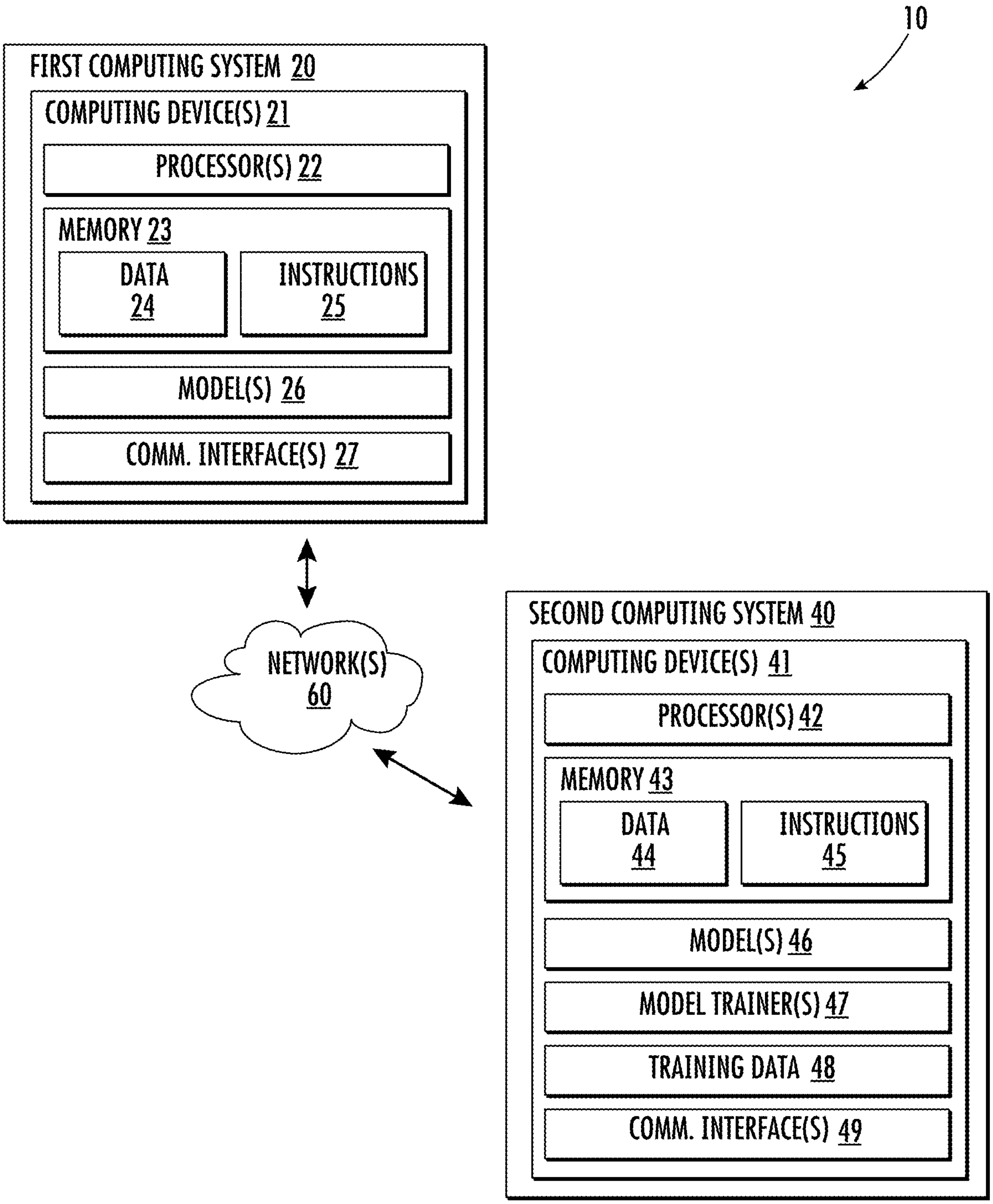
FIG. 11 is a block diagram of an example computing system, according to some implementations of the present disclosure.

FIG. 11 is a block diagram of an example computing ecosystem 10 according to example implementations of the present disclosure. The example computing ecosystem 10 can include a first computing system 20 and a second computing system 40 that are communicatively coupled over one or more networks 60. In some implementations, the first computing system 20 or the second computing 40 can implement one or more of the systems, operations, or functionalities described herein for validating one or more systems or operational systems (e.g., the remote system 160, the onboard computing system 180, the autonomy system 201, etc.).

In some implementations, the first computing system 20 can be included in an autonomous platform and be utilized to perform the functions of an autonomous platform as described herein. For example, the first computing system 20 can be located onboard an autonomous vehicle and implement autonomy system for autonomously operating the autonomous vehicle. In some implementations, the first computing system 20 can represent the entire onboard computing system or a portion thereof (e.g., the localization system 230, the perception system 240, the planning system 250, the control system 260, or a combination thereof, etc.). In other implementations, the first computing system 20 may not be located onboard an autonomous platform. The first computing system 20 can include one or more distinct physical computing devices 21.

The first computing system 20 (e.g., the computing devices 21 thereof) can include one or more processors 22 and a memory 23. The one or more processors 22 can be any suitable processing device (e.g., a processor core, a microprocessor, an ASIC, a FPGA, a controller, a microcontroller, etc.) and can be one processor or a plurality of processors that are operatively connected. Memory 23 can include one or more non-transitory computer-readable storage media, such as RAM, ROM, EEPROM, EPROM, one or more memory devices, flash memory devices, etc., and combinations thereof.

Memory 23 can store information that can be accessed by the one or more processors 22. For instance, the memory 23 (e.g., one or more non-transitory computer-readable storage media, memory devices, etc.) can store data 24 that can be obtained (e.g., received, accessed, written, manipulated, created, generated, stored, pulled, downloaded, etc.). The data 24 can include, for instance, sensor data, map data, data associated with autonomy functions (e.g., data associated with the perception, planning, or control functions), simulation data, or any data or information described herein. In some implementations, the first computing system 20 can obtain data from one or more memory devices that are remote from the first computing system 20.

Memory 23 can store computer-readable instructions 25 that can be executed by the one or more processors 22. Instructions 25 can be software written in any suitable programming language or can be implemented in hardware. Additionally, or alternatively, instructions 25 can be executed in logically or virtually separate threads on the processors 22.

For example, the memory 23 can store instructions 25 that are executable by one or more processors (e.g., by the one or more processors 22, by one or more other processors, etc.) to perform (e.g., with the computing devices 21, the first computing system 20, or other systems having processors executing the instructions) any of the operations, functions, or methods/processes (or portions thereof) described herein. For example, operations can include implementing system validation, interference determination, or other functions.

In some implementations, the first computing system 20 can store or include one or more models 26. In some implementations, the models 26 can be or can otherwise include one or more machine-learned models (e.g., a machine-learned operational system, etc.). As examples, the models 26 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the first computing system 20 can include one or more models for implementing subsystems of the autonomy system 201, including any of: the localization system 230, the perception system 240, the planning system 250, or the control system 260.

In some implementations, the first computing system 20 can obtain the one or more models 26 using communication interface 27 to communicate with the second computing system 40 over the network 60. For instance, the first computing system 20 can store the models 26 (e.g., one or more machine-learned models) in memory 23. The first computing system 20 can then use or otherwise implement the models 26 (e.g., by the processors 22). By way of example, the first computing system 20 can implement the models 26 to localize an autonomous platform in an environment, perceive an autonomous platform's environment or objects therein, plan one or more future states of an autonomous platform for moving through an environment, control an autonomous platform for interacting with an environment, etc.

The second computing system 40 can include one or more computing devices 41. The second computing system 40 can include one or more processors 42 and a memory 43. The one or more processors 42 can be any suitable processing device (e.g., a processor core, a microprocessor, an ASIC, a FPGA, a controller, a microcontroller, etc.) and can be one processor or a plurality of processors that are operatively connected. The memory 43 can include one or more non-transitory computer-readable storage media, such as RAM, ROM, EEPROM, EPROM, one or more memory devices, flash memory devices, etc., and combinations thereof.

Memory 43 can store information that can be accessed by the one or more processors 42. For instance, the memory 43 (e.g., one or more non-transitory computer-readable storage media, memory devices, etc.) can store data 44 that can be obtained. The data 44 can include, for instance, sensor data, model parameters, map data, simulation data, simulated environmental scenes, simulated sensor data, data associated with vehicle trips/services, or any data or information described herein. In some implementations, the second computing system 40 can obtain data from one or more memory devices that are remote from the second computing system 40.

Memory 43 can also store computer-readable instructions 45 that can be executed by the one or more processors 42. The instructions 45 can be software written in any suitable programming language or can be implemented in hardware. Additionally, or alternatively, the instructions 45 can be executed in logically or virtually separate threads on the processors 42.

For example, memory 43 can store instructions 45 that are executable (e.g., by the one or more processors 42, by the one or more processors 22, by one or more other processors, etc.) to perform (e.g., with the computing devices 41, the second computing system 40, or other systems having processors for executing the instructions, such as computing devices 21 or the first computing system 20) any of the operations, functions, or methods/processes described herein. This can include, for example, the functionality of the autonomy system 201 (e.g., localization, perception, planning, control, etc.) or other functionality associated with an autonomous platform (e.g., remote assistance, mapping, fleet management, trip/service assignment and matching, etc.). This can also include, for example, validating a machined-learned operational system.

In some implementations, second computing system 40 can include one or more server computing devices. In the event that the second computing system 40 includes multiple server computing devices, such server computing devices can operate according to various computing architectures, including, for example, sequential computing architectures, parallel computing architectures, or some combination thereof.

Additionally, or alternatively to, the models 26 at the first computing system 20, the second computing system 40 can include one or more models 46. As examples, the models 46 can be or can otherwise include various machine-learned models (e.g., a machine-learned operational system, etc.) such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the second computing system 40 can include one or more models of the autonomy system 201.

In some implementations, the second computing system 40 or the first computing system 20 can train one or more machine-learned models of the models 26 or the models 46 through the use of one or more model trainers 47 and training data 48. The model trainer 47 can train any one of the models 26 or the models 46 using one or more training or learning algorithms. One example training technique is backwards propagation of errors. In some implementations, the model trainer 47 can perform supervised training techniques using labeled training data. In other implementations, the model trainer 47 can perform unsupervised training techniques using unlabeled training data. In some implementations, the training data 48 can include simulated training data (e.g., training data obtained from simulated scenarios, inputs, configurations, environments, etc.). In some implementations, the second computing system 40 can implement simulations for obtaining the training data 48 or for implementing the model trainer 47 for training or testing the models 26 or the models 46. By way of example, the model trainer 47 can train one or more components of a machine-learned model for the autonomy system 201 through unsupervised training techniques using an objective function (e.g., costs, rewards, metrics, constraints, etc.). In some implementations, the model trainer 47 can perform a number of generalization techniques to improve the generalization capability of the models being trained. Generalization techniques include weight decays, dropouts, or other techniques.

For example, in some implementations, the second computing system 40 can generate training data 48 according to example aspects of the present disclosure. For instance, the second computing system 40 can generate training data 48. For instance, the second computing system 40 can implement methods according to example aspects of the present disclosure. The second computing system 40 can use the training data 48 to train models 26. For example, in some implementations, the first computing system 20 can include a computing system onboard or otherwise associated with a real or simulated autonomous vehicle. In some implementations, models 26 can include perception or machine vision models configured for deployment onboard or in service of a real or simulated autonomous vehicle. In this manner, for instance, the second computing system 40 can provide a training pipeline for training models 26.

The first computing system 20 and the second computing system 40 can each include communication interfaces 27 and 49, respectively. The communication interfaces 27, 49 can be used to communicate with each other or one or more other systems or devices, including systems or devices that are remotely located from the first computing system 20 or the second computing system 40. The communication interfaces 27, 49 can include any circuits, components, software, etc. for communicating with one or more networks (e.g., the network 60). In some implementations, the communication interfaces 27, 49 can include, for example, one or more of a communications controller, receiver, transceiver, transmitter, port, conductors, software or hardware for communicating data.

The network 60 can be any type of network or combination of networks that allows for communication between devices. In some implementations, the network can include one or more of a local area network, wide area network, the Internet, secure network, cellular network, mesh network, peer-to-peer communication link or some combination thereof and can include any number of wired or wireless links. Communication over the network 60 can be accomplished, for instance, through a network interface using any type of protocol, protection scheme, encoding, format, packaging, etc.

FIG. 11 illustrates one example computing ecosystem 10 that can be used to implement the present disclosure. For example, one or more systems or devices of ecosystem 10 can implement any one or more of the systems and components described in the preceding figures. For example, in some implementations, the first computing system 20 can include the model trainer 47 and the training data 48. In such implementations, the models 26, 46 can be both trained and used locally at the first computing system 20. As another example, in some implementations, the computing system 20 may not be connected to other computing systems. Additionally, components illustrated or discussed as being included in one of the computing systems 20 or 40 can instead be included in another one of the computing systems 20 or 40.

Computing tasks discussed herein as being performed at computing devices remote from the autonomous platform (e.g., autonomous vehicle) can instead be performed at the autonomous platform (e.g., via a vehicle computing system of the autonomous vehicle), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate operations. Such identifiers are provided for the ease of the reader and do not denote a particular order of steps or operations. An operation illustrated by a list identifier of (a), (i), etc. can be performed before, after, or in parallel with another operation illustrated by a list identifier of (b), (ii), etc.

The term "can" should be understood as referring to a possibility of a feature in various implementations and not as prescribing an ability that is necessarily present in every implementation. For example, the phrase "X can perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

The term "may" should be understood as referring to a possibility of a feature in various implementations and not as prescribing an ability that is necessarily present in every implementation. For example, the phrase "X may perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

What is claimed is:

1. A computer-implemented method comprising:

obtaining, by a computing system comprising one or more processors, from one or more sensors, sensor data that is indicative of an object within an environment of an autonomous vehicle and that is associated with a first timeframe;

obtaining, by the computing system, object-track data that indicates a track of the object, wherein the track of the object comprises a plurality of points indicating one or more past locations of the object, the object-track data generated based on the sensor data;

obtaining, by the computing system, autonomous vehicle-track data that indicates a track of the autonomous vehicle in the environment;

determining, by the computing system, that at least a portion of the track of the object overlaps with the track of the autonomous vehicle;

determining, by the computing system, for the first timeframe, that a threshold quantity of first sensor data points associated with the track of the object are at least partially within a threshold distance of the track of the autonomous vehicle, the first timeframe being associated with the acquisition of the first sensor data points, wherein the sensor data includes the first sensor data points;

determining, by the computing system, for the first timeframe, the first sensor data points have a threshold closing velocity relative to the autonomous vehicle;

based on the determination that at least a portion of the track of the object overlaps with the track of the autonomous vehicle, that the threshold quantity of first sensor data points associated with the track of the object is at least partially within the threshold distance of the track of the autonomous vehicle, and the first sensor data points have the threshold closing velocity, determining, by the computing system, an occurrence of a potential interference between the object and the autonomous vehicle for the first timeframe; and initiating, by the computing system, a motion control action by the autonomous vehicle based on the occurrence of the potential interference between the object and the autonomous vehicle for the first timeframe.

2. The computer-implemented method of claim 1, further comprising:

determining, by the computing system, that a number of first sensor data points associated with the track of the object that are at least partially within the threshold distance of the track of the autonomous vehicle, satisfies the threshold quantity; and determining, by the computing system, a first closing velocity based on the sensor data.

3. The computer-implemented method of claim 2, further comprising:

determining, by the computing system, that the first closing velocity satisfies the threshold closing velocity.

4. The computer-implemented method of claim 1, further comprising:

determining, by the computing system, for a second timeframe that is subsequent to the first timeframe, that the threshold quantity of second sensor data points associated with the object are at least partially within the threshold distance of the track of the autonomous vehicle, the second timeframe being associated with the acquisition of the second sensor data points;

determining, by the computing system, for the second timeframe, the second sensor data points have a threshold closing velocity relative to the autonomous vehicle;

based on the determination that the threshold quantity of second sensor data points is at least partially within the threshold distance of the track of the autonomous vehicle, and the second sensor data points having the threshold closing velocity, determining, by the computing system, an occurrence of a potential interference between the object and the autonomous vehicle for the second timeframe; and initiating, by the computing system, a motion control action by the autonomous vehicle based on an occurrence of a potential interference between the object and the autonomous vehicle for the second timeframe.

5. The computer-implemented method of claim 4, wherein the sensor data comprises LIDAR data, the first timeframe is associated with a first LIDAR sweep of a LIDAR system of the autonomous vehicle, and the second timeframe is associated with a second LIDAR sweep of the LIDAR system, the second LIDAR sweep occurring after the first LIDAR sweep.

6. The computer-implemented method of claim 4, further comprising:

determining, by the computing system, based on the occurrence indication of the potential interference between the object and the autonomous vehicle for the first timeframe and the occurrence of the potential interference between the object and the autonomous vehicle for the second timeframe, that an interference between the object and the autonomous vehicle has occurred;

generating, by the computing system, based on the determination that the interference between the autonomous vehicle and the object has occurred, an interference alert; and providing, by the computing system, the interference alert.

7. The computer-implemented method of claim 6, wherein the interference alert comprises at least one of: (1) a likelihood that the interference is real, (2) a classification of the object, (3) an identifier associated with the track, (4) a location of the interference within the environment, (5) a location of the interference on the autonomous vehicle, (6) a time of the interference, (7) a relative speed of the object at the time of the interference, (8) a direction of travel of the object at the time of the interference, or (9) degree of entanglement between the autonomous vehicle and the object following the interference.

8. The computer-implemented method of claim 6, wherein providing the interference alert comprises at least one of providing, over a network, the interference alert to a system that is remote from the autonomous vehicle, or providing the interference alert to a system onboard the autonomous vehicle.

9. The computer-implemented method of claim 7, further comprising:

initiating, by the computing system, a motion control action by the autonomous vehicle based on the interference alert.

10. The computer-implemented method of claim 9, wherein the motion control action comprises at least one of stopping the autonomous vehicle in a current travel lane, or stopping the autonomous vehicle on a shoulder of a travel way.

11. The computer-implemented method of claim 1, further comprising:

determining, by the computing system, that the track of the object is a non-ephemeral track.

12. The computer-implemented method of claim 1, wherein the threshold distance comprises a buffer distance from an exterior surface of the autonomous vehicle.

13. A vehicle control system comprising:

one or more processors; and one or more tangible, non-transitory, computer-readable media that store instructions that are executable by the one or more processors to perform operations comprising:

obtaining, from one or more sensors, sensor data that is indicative of an object within an environment of an autonomous vehicle and that is associated with a first timeframe;

obtaining object-track data that indicates a track of the object, wherein the track of the object comprises a plurality of points indicating one or more past locations of the object, the object-track data generated based on the sensor data:

obtaining autonomous vehicle-track data that indicates a track of the autonomous vehicle in the environment;

determining that at least a portion of the track of the object overlaps with the track of the autonomous vehicle;

determining, for the first timeframe, that a threshold quantity of first sensor data points associated with the track of the object is at least partially within a threshold distance of the track of the autonomous vehicle, the first timeframe being associated with the acquisition of the first sensor data points, wherein the sensor data includes the first sensor data points;

determining, for the first timeframe, the first sensor data points have a threshold closing velocity relative to the autonomous vehicle;

based on the determination that at least a portion of the track of the object overlaps with the track of the autonomous vehicle, that the threshold quantity of first sensor data points associated with the track of the object is at least partially within the threshold distance of the track of the autonomous vehicle, and the first sensor data points have the threshold closing velocity, determining an occurrence of a potential interference between the object and the autonomous vehicle for the first timeframe; and initiating a motion control action by the autonomous vehicle based on the occurrence of the potential interference between the object and the autonomous vehicle for the first timeframe.

14. The vehicle control system of claim 13, wherein the operations further comprise:

determining a first closing velocity of the object based on a centroid of the first sensor data points associated with the object.

15. The vehicle control system of claim 14, wherein the operations further comprise:

determining that the first closing velocity of the object satisfies the threshold closing velocity.

16. The vehicle control system of claim 13, wherein the operations further comprise:

obtaining inertial measurement data associated with the autonomous vehicle; and determining the occurrence of the potential interference based on the inertial measurement data.

17. The vehicle control system of claim 13, wherein the operations further comprise:

obtaining audio data associated with the autonomous vehicle; and determining the occurrence of the potential interference based on the audio data.

18. The vehicle control system of claim 13, wherein the operations further comprise:

determining, for a second timeframe that is subsequent to the first timeframe, that the threshold quantity of second sensor data points associated with the object are at least partially within the threshold distance of the track of the autonomous vehicle, the second timeframe being associated with the acquisition of the second sensor data points;

determining, for the second timeframe, the second sensor data points have a threshold closing velocity relative to the autonomous vehicle;

based on the determination that the threshold quantity of second sensor data points is at least partially within the threshold distance of the track of the autonomous vehicle and the second sensor data points having the threshold closing velocity, determining an occurrence of a potential interference between the object and the autonomous vehicle for the second timeframe; and initiating a motion control action by the autonomous vehicle based on the occurrence of the potential interference between the object and the autonomous vehicle for the second timeframe.

19. The vehicle control system of claim 18, wherein the operations further comprise:

determining, based on the occurrence of the potential interference between the object and the autonomous vehicle for the first timeframe and the occurrence of the potential interference between the object and the autonomous vehicle for the second timeframe, that an interference between the object and the autonomous vehicle has occurred;

generating, based on the determination that the interference between the autonomous vehicle and the object has occurred, an interference alert; and providing the interference alert.

20. One or more tangible, non-transitory, computer readable media storing instructions that are executable by one or more processors to perform operations comprising:

obtaining, by a computing system comprising one or more processors, from one or more sensors, sensor data that is indicative of an object within an environment of an autonomous vehicle and that is associated with a first timeframe;

obtaining, by the computing system, object-track data that indicates a track of the object, wherein the track of the object comprises a plurality of points indicating one or more past locations of the object, the object-track data generated based on the sensor data;

obtaining, by the computing system, autonomous vehicle-track data that indicates a track of the autonomous vehicle in the environment;

determining, by the computing system, that at least a portion of the track of the object overlaps with the track of the autonomous vehicle;

determining, by the computing system, for the first timeframe, that a threshold quantity of first sensor data points associated with the track of the object is at least partially within a threshold distance of the track of the autonomous vehicle, the first timeframe being associated with the acquisition of the first sensor data points, wherein the sensor data includes the first sensor data points;

determining, by the computing system, for the first timeframe, the first sensor data points have a threshold closing velocity relative to the autonomous vehicle;

based on the determination that at least a portion of the track of the object overlaps with the track of the autonomous vehicle, that the threshold quantity of first sensor data points associated with the track of the object is at least partially within the threshold distance of the track of the autonomous vehicle, and the first sensor data points have the threshold closing velocity, determining, by the computing system, an occurrence of a potential interference between the object and the autonomous vehicle for the first timeframe; and initiating, by the computing system, a motion control action by the autonomous vehicle based on the occurrence of the potential interference between the object and the autonomous vehicle for the first timeframe.

* * * * *